United States Patent [19]

Nguyen et al.

[11] Patent Number: 5,130,394

[45] Date of Patent: * Jul. 14, 1992

[54] STARCH GRAFT POLYMERS

[75] Inventors: Charles C. Nguyen; Verne J. Martin, both of Cedar Rapids; Edward P. Pauley, Jesup, all of Iowa

[73] Assignee: Penford Products Company, Cedar Rapids, Iowa

[ * ] Notice: The portion of the term of this patent subsequent to Mar. 26, 2008 has been disclaimed.

[21] Appl. No.: 650,964

[22] Filed: Feb. 5, 1991

Related U.S. Application Data

[63] Continuation of Ser. No. 472,632, Feb. 5, 1990, Pat. No. 5,003,022, which is a continuation-in-part of Ser. No. 309,248, Feb. 10, 1989, abandoned.

[51] Int. Cl.$^5$ ............................................. C08G 89/00
[52] U.S. Cl. .................................... 527/300; 527/303; 527/313; 527/314; 527/315
[58] Field of Search ............... 527/300, 303, 313, 314, 527/315

[56] References Cited

U.S. PATENT DOCUMENTS

| | | | |
|---|---|---|---|
| 2,914,495 | 11/1959 | Gordon et al. | 524/53 |
| 2,922,768 | 1/1960 | Mino et al. | 525/246 |
| 3,061,471 | 10/1962 | Brockway et al. | 428/395 |
| 3,061,472 | 10/1962 | Brockway | 427/392 |
| 3,095,391 | 6/2963 | Brockway et al. | 527/312 |
| 3,138,564 | 6/1964 | Borunsky | 527/312 |
| 3,332,897 | 7/1967 | Ray-Chaudhuri | 525/54.3 |
| 3,632,535 | 1/1972 | Gramera et al. | 524/734 |
| 3,984,361 | 10/1976 | Gugliemelli et al. | 522/86 |
| 4,029,616 | 6/1977 | Nakashio et al. | 524/732 |
| 4,192,783 | 3/1980 | Bomball et al. | 524/21 |
| 4,204,983 | 5/1980 | Swarthout et al. | 524/732 |
| 4,301,017 | 11/1981 | Kightlinger et al. | 252/8.6 |
| 4,322,322 | 3/1982 | Lambrechts et al. | 524/734 |
| 4,375,535 | 3/1983 | Kightlinger et al. | 527/313 |
| 4,477,535 | 10/1984 | Sinclair et al. | 428/476.3 |
| 4,552,940 | 11/1985 | Van Eenam | 527/312 |
| 4,560,724 | 12/1985 | Brabetz et al. | 524/734 |
| 4,567,099 | 1/1986 | Van Gilder et al. | 428/327 |
| 4,835,212 | 5/1989 | Degen et al. | 524/734 |
| 4,839,450 | 6/1989 | Fanta et al. | 527/313 |
| 5,003,022 | 3/1991 | Nguyen et al. | 527/313 |
| 5,004,767 | 4/1991 | Krause et al. | 524/30 |

FOREIGN PATENT DOCUMENTS 0408099 1/1991 European Pat. Off. .

OTHER PUBLICATIONS

Comas, et al.,. "A Study of Graft Polymers of Wheat Starch and Noncarbohydrate Monomers for Industrial Applications", Stanford Research Institute, Menlo Park, Calif., Project No. PU-3206 (1963).
Gugliemellit, et al., J. Appl. Polym. Sci., vol. 23, 634–644 (1979).
Gugliemelli, et al., J. Polym. Sci. Polym. Letters Ed., vol. 14, pp. 215-218 (1976).
Moller, et al., Abstract: "Novel Starch Containing Polymer Dispersions as Binders for Paper and Board Coating" (Jun. 1989).
Moller, et al., "Novel Starch Containing Polymer Disperions as Coating Binders" (May 1990).

*Primary Examiner*—Nathan M. Nutter
*Attorney, Agent, or Firm*—Marshall, O'Toole, Gerstein, Murray & Bicknell

[57] ABSTRACT

A stable aqueous polymeric dispersion comprising a graft copolymer of thinned, gelatinized starch and one or more vinyl grafting monomers, the vinyl monomers including at least 10% by weight 1,3-butadiene is disclosed. Also disclosed are paper coating color compositions comprising the polymeric dispersions and pigments and improved high gloss papers coated with the coating color compositions.

1 Claim, No Drawings

STARCH GRAFT POLYMERS

This is a continuation of application Ser. No. 07/472,632 filed Feb. 5, 1990 and now U.S. Pat. No. 5,003,022 which is a continuation-in-part of application Ser. No. 07/309,248 filed Feb. 10, 1988 and now abandoned.

This is a continuation-in-part of application Ser. No. 07/309,248 filed Feb. 10, 1989.

BACKGROUND OF THE INVLNTION

The present invention relates generally to adhesive compositions and more specifically to graft copolymers of starch and vinyl monomers which may be utilized as binding materials in applications including but not limited to paper coating compositions. Specifically, the invention provides improved aqueous polymeric dispersions comprising a graft copolymer of a thinned, gelatinized starch and one or more vinyl grafting monomers, said vinyl grafting monomers comprising at least 10% 1,3-butadiene by weight. The invention further provides such aqueous polymeric dispersions wherein the grafting monomers comprise a vinyl monomer other than 1,3-butadiene in addition to 1,3-butadiene.

It is well known to treat paper and other similar substrates with coating compositions in order to confer improved properties such as gloss, smoothness and printability. In general, paper coatings are comprised of two major components: pigment and binder. Pigment is generally comprised of kaolin clay, either alone or in combination with other pigments such as titanium dioxide, calcium carbonate and plastic pigment. The functions of the pigment in the coating include filling in the irregularities of the paper surface and providing gloss, brightness and ink absorbency. The binder functions to hold the pigment particles together and to bind them to the substrate surface. Natural polymers such as casein, protein and starch are commonly used as the pigment binder in coating formulations. Among these polymers, starch is by far the most important pigment-coating adhesive, primarily because of its low cost. Starch has good binding properties and due to its hydrophilic character, contributes water-holding properties to the coating which dramatically affect the performance of the coating. Paper coated with coating formulations comprising starch as a binder, however, is somewhat lacking in plasticity and gloss after it has been finished.

Rubber latexes and various other synthetics are also used as binders in paper coating compositions. Paper coating materials comprising styrene-butadiene latex are well known in the art and are characterized by low viscosity and by providing improved gloss and softer sheet properties to papers to which they have been coated. Latex, however, is expensive and has poor water holding properties.

Blends of starch and synthetic latex materials are used as binding materials to address the respective deficiencies of the two materials. The use of such blends, particularly blends of modified starch materials with latex materials, provides the combination of advantageous qualities of each of the two types of binder materials. One disadvantage of such blends, however, is mottle wherein differential migration of the binders during the paper drying process produces spots and lack of uniformity on the surface of treated paper. Different areas of the paper surface then accept printing ink differently which can lead to a mottled appearance of the final printed paper.

As one approach to providing improved coating binders, it is known in the art to form graft copolymers of starch and synthetic monomer materials. Brockway, U.S. Pat. No. 3,095,391 teaches the preparation of graft copolymers of granular unpasted starch and a wide variety of vinylic monomers utilizing initiators selected from the group consisting of hydrogen peroxide, organic peroxides, hydroperoxides and sodium hypochlorite. The graft copolymers are said to have utility in textile finishing and sizing as well as in paper making as binders and retention aids The patent teaches that the pasting properties of the original starch are modified by the grafting procedure and that when the engrafted polymer is hydrophobic, the pasting property of the granular starch is inhibited such that pasting in water is impossible unless the engrafted polymer content is low.

Borunsky, U.S Pat. No. 3,138,564 discloses a process for utilizing ozone or oxygen to initiate grafting of vinyl monomers onto polysaccharide materials. The reference specifically discloses one example in which styrene and 1,3-butadiene are said to be grafted onto oxidized granular starch. No disclosure is made with respect to grafting efficiency or directed to use of the grafted materials in adhesive or paper coating applications.

Brockway, et al., U.S. Pat. No. 3,061,471 teaches the desirability of gelatinizing starch prior to grafting with monomers in order to produce stable aqueous dispersions with properties similar to those of latexes of other polymers This patent and Brockway, U.S. Pat. No. 3,061,472 disclose the use of peroxide and persulfate initiators for the grafting of acrylate esters to gelatinized starch The starch graft copolymer materials of Brockway, however, are limited in their commercial appeal because of their lack of stability at high solids levels and tendency to separate on storage.

Kightlinger, et al., U.S. Pat. No. 4,301,017 discloses a stable aqueous polymeric dispersion comprised of at least 25% solids by weight of graft copolymer of at least one vinyl monomer and a derivatized and thinned starch. (Kightlinger, et al., U.S. Pat. No. 4,375,535 is similar and discloses a stable aqueous polymeric dispersion comprised of at least 25% solids by weight of a graft copolymer of at least one vinyl monomer and a derivatized and thinned amylopectin starch.) The kightlinger patents teach that the stability problems experienced by the Brockway dispersions result, in part, from the nonspecific nature of peroxide and other initiators utilized by Brockway which induce homo-and copolymerization of monomers instead of the desired grafting to starch. The patents disclose that such problems can be minimized or avoided by use of a cerium initiator. After the conclusion of the ceric ion initiated grafting reaction, however, the patent teaches the use of ammonium persulfate and sodium metabisulfite to reduce the level of unreacted monomers by initiating homo-and copolymerization of those monomers.

The Kightlinger patents further disclose the use of a thinned starch derivative disclosed to have a degree of substitution of at least about 0.05 and an intrinsic viscosity of not less than 0.12 deciliters per gram (dl/g). The degree of thinning is taught to affect the tensile properties of the product when used in applications such as paper coatings and the patent states that such properties become much diminished when the intrinsic viscosity of the thinned starch falls below about 0.12 dl/g.

Thge Kightlinger patents further disclose the use of a dispersion comprising ethyl acrylate/acrylonitrile grafted to starch as a paper coating composition. The acrylate containing starch graft copolymer dispersions disclosed by Kightlinger are limited in their commercial utility, however. While paper coating compositions made up of such starch graft copolymer dispersions are disclosed to provide particularly good qualities (especially gloss) to paper, the acrylate monomers are considered relatively costly.

There exists a desire in the art, therefore, for a stable high solids dispersion having the advantages of the acrylate containing starch graft copolymer dispersions of Kightlinger and for products such as paper coatings and coated papers comprising that product, but which are available at relatively low cost. Attempts have been made, heretofore, to successfully graft monomers which are less costly (and less reactive) than acrylates onto gelatinized starch. Comas, et al., "*A Study of Graft Polymers of Wheat Starch and Noncarbohydrate Monomers for Industrial Applications,*" Stanford Research Institute, Menlo Park, California, Project No PU-3206 (1963) describes efforts using ceric ion to graft a variety of monomers to gelatinized starch. While attempts to graft monomers such as acrylonitrile, methyl methacrylate and butyl acrylate were generally successful, attempts to treat starch with less reactive monomers such as chloroprene, 1,3-butadiene and styrene resulted in little or no grafting. It is desired that such grafting be relatively efficient because of the negative health and environmental effects of unreacted monomer and the costly equipment and procedures required to recover such unreacted monomer.

Gugliemelli, et al., U.S. Pat. No. 3,984,361 and Gugliemelli, et al., *J. Polym. Sci.*, Polym. Letters Ed., Vol. 14, pp. 215-218 (1976) disclose the successful grafting of chloroprene onto gelatinized starch which they characterize as surprising given the unsuccessful attempts to graft butadiene of Comas, et al. In Gugliemelli, et al., *J. App. Polym Sci.*, Vol. 23, 635-644 (1979), it was reported that isoprene does not graft onto gelatinized starch by cerium initiation but rather that it requires the presence of an "initiator-monomer" such as acrylonitrile to obtain copolymer side chains. The publication further suggested that other monomers that normally do not graft onto starch by cerium (IV) initiation could be incorporated in starch in graft form by cografting with monomers that normally graft and that have suitable copolymer reactivities. Nevertheless, the art has failed to disclose either grafting of 1,3-butadiene alone or of 1,3-butadiene and other monomers to gelatinized starch at a grafting efficiency sufficiently high as to provide a useful product for applications such as paper coating.

SUMMARY OF THE INVENTION

The present invention is based upon the surprising discovery that 1,3-butadiene can be successfully grafted with a high degree of grafting efficiency to a gelatinized starch material. Specifically, the invention provides stable aqueous polymeric dispersions comprised of a graft copolymer of a thinned, gelatinized starch and one or more vinyl grafting monomers wherein the vinyl grafting monomers comprise at least 10% 1,3-butadiene by weight The invention further provides a stable aqueous polymeric dispersion wherein the grafting monomers comprise a vinyl monomer other than 1,3-butadiene in addition to 1,3-butadiene. These dispersions are made by a process which provides a high grafting efficiency and a final product which is characterized by a low ratio of ungrafted polymers to grafted starch as manifested by a low weight ratio of extractable vinyl grafting monomer(s) and polymers thereof to unextractable solids which solids comprise grafted and ungrafted starch. Preferred methods according to the present invention are capable of providing 1,3-butadiene containing grafted products which are characterized by low residual monomer levels and are substantially free of coagulum produced by homo- or copolymerization of the vinyl monomers. The invention provides a process of making a stable aqueous polymeric dispersion in a reactor at elevated pressure and temperature (up to 120° C.) in the presence of persulfate, peroxide or other suitable initiators in order to graft vinyl monomers comprising at least 10% 1,3-butadiene by weight to a starch polymer backbone.

Specifically, the invention provides a stable aqueous dispersion comprised of at least 20%, and preferably 30% solids by weight, comprising a graft copolymer of starch and vinyl grafting monomers, said vinyl grafting monomers comprising at least 10% 1,3-butadiene by weight, with a grafting monomer to starch ratio of between about 2:10 and 23:10 and characterized by having a weight ratio of extractable grafting monomer(s) and polymers thereof to unextractable solids comprising grafted starch (grafted starch including cross-linked grafted starch and any starch which may have escaped grafting as well as any polymers of the grafted monomer(s) which have cross-linked sufficiently so as to be unextractable) of 0.2 or less and preferably 0.1 or less and most preferably 0.05 or less. This ratio is also referred to herein as the "ratio of extractable monomers and polymers/unextractable solids" or the "extractable/unextractable ratio." The vinyl grafting monomers preferably comprise from 10% to 70% 1,3-butadiene by weight, but according to one surprising aspect of the invention, up to 100% 1,3-butadiene can be grafted with high efficiency to a thinned gelatinized starch without any requirement for other vinyl grafting monomers. The invention provides for highly efficient grafting of the relatively inactive 1,3-butadiene monomer to gelatinized thinned starch such that the stable aqueous dispersion which results is characterized by low levels of ungrafted monomers and polymers as well as low levels of coagulum produced by homo- or copolymerization of the grafting monomers.

In accordance with the desired end uses of the product, the stable aqueous dispersion is generally characterized by a solids content of at least 20% by weight. Preferably, the solids content is at least 30% by weight and most preferably above 45% by weight. The dispersion has useful properties at viscosities ranging from the very low to the very high. Nevertheless, while the viscosity of the dispersion is generally at least 50 cps, it is preferably less than 10,000 cps, more preferably less than 2,000 cps and most preferably less than 1,000 cps.

The stable aqueous dispersions of the invention can be used as adhesives and as binding materials in a variety of applications including compositions for the coating of paper and other similar substrates. Given the particularly useful characteristics of the dispersions, it is contemplated that those of skill in the art would find numerous other applications for the graft copolymer materials. It is contemplated that the dispersions be particularly useful as textile sizes, adhesives in nonwoven fabrics, modifiers in plastics, as components of water-based inks and wet-end starches in paper manufacturing processes. It is also contemplated that the graft copolymer dispersions will find utility as films for consumer applications such as the production of "plastic" bags and the like and in industrial and agricultural applications such as the production of agricultural mulchfilms.

The dispersions are particularly useful as binding materials in coating compositions for paper and other substrates where they are capable of providing unique properties to the coated end product. Paper coatings comprising the graft copolymer materials of the invention as binders exhibit a unique combination of improved properties. When used as binders in paper coating compositions, the materials of the invention provide positive properties associated with starch binders such as binding strength, color and film clarity, water retention and low cost. Additionally, the materials further provide positive properties associated with synthetic latex materials such as high gloss, good water resistance and good ink interaction while avoiding the mottle typically associated with blends of starch and latex materials.

In addition, the high degree of stability of the dispersions of the present invention is such that they can be mixed under high shear conditions with dry clay. Such high shear mixing of prior art blends of starch and latex results in agglomeration of the latex. Other methods of mixing starch/latex blends with clay involve adding water to suspend the clay. Unfortunately, such added water cannot then readily be removed with the result that the total solids content of such mixtures is thereby limited.

One limitation of prior art starch graft copolymer materials relates to their ability to provide coated papers with high gloss and smoothness while maintaining porosity and ink receptivity. It is generally understood in the art that high coating permeability requires low coating weights such as 3 to 4 pounds per side per 3,300 square feet. Such low coating weights are generally inconsistent with high gloss and smoothness levels. Nevertheless, while increasing coating weight tends to improve the gloss and smoothness of a coated paper, high coating weights generally tend to reduce a paper's porosity and ink receptivity because the action of finishing equipment tends to densify the base sheet and close-up the coating. The preferred styrene/butadiene-1,3 containing starch graft copolymer compositions provided herein are surprisingly capable of providing coated papers with high gloss and smoothness while maintaining high levels of porosity and ink receptivity. Without wishing to be bound by any theory of their invention on this point, the inventors believe that this surprising effect results as a consequence of an interaction between the hydrophobic nature of the vinyl grafting monomers such as styrene and 1,3-butadiene and the hydrophilic nature of the grafted starch backbone.

The present invention further provides an improved process for coating paper and other substrates utilizing the 1,3-butadiene containing dispersion of the invention. The dispersion may be used to partially or completely replace starch, latex or both in coating color compositions. Papers coated by means of coating color compositions comprising the dispersions of the invention are characterized by reduced mottle and by improved gloss, strength and other properties including the combination of high gloss and smoothness with elevated levels of porosity and ink receptivity. In addition, printing papers coated with color coating compositions of the present invention have been shown to exhibit sharper printing quality as measured by reduced dot gain combined with increased solid ink density. This combination of effects is surprising in light of the conventional tendency of dot gain to increase with increases in ink density.

A further surprising aspect of the present invention relates to the discovery that graft copolymer dispersions produced from highly thinned gelatinized starches characterized by an intrinsic viscosity of less than 0.12 dl/g are particularly useful as binders in coating color compositions for the coating of paper. Such binders have been found to exhibit improved binding characteristics and tensile properties compared with graft copolymer dispersions produced from starches characterized by intrinsic viscosities greater than 0.12 dl/g. While preferred binders comprise at least 10% 1,3-butadiene by weight, the improvement in binding strength of graft copolymers comprising such thinned starches is not thought to be limited to 1,3-butadiene containing compositions.

DETAILED DESCRIPTION

The present invention provides methods for the preparation of an improved aqueous dispersion of a graft copolymer of thinned, gelatinized starch and one or more vinyl grafting monomers comprising at least 10% 1,3-butadiene by weight. The invention further provides the aqueous polymeric dispersion wherein the grafting monomers comprise one or more vinyl monomers other than 1,3-butadiene in addition to 1,3-butadiene. According to the invention, a paste of thinned starch is reacted with vinyl grafting monomers including 1,3-butadiene in the presence of a suitable initiator (catalyst) and for a period of time sufficient to provide the graft copolymer of the invention.

SUITABLE STARCH MATERIALS

Starch materials useful according to the present invention include practically all thinned starches of plant origin including starches from corn, wheat, potatoes, tapioca, rice, sago and sorghum, with corn starch being preferred. Waxy and high amylose starches are also thought to be suitable. The starches can be thinned by acid hydrolysis, oxidative hydrolysis or enzymatic degradation. By the term "thinned starch," it is contemplated that thin natural polysaccharide materials such as dextrins, maltodextrins, chemically substituted maltodextrins and enzyme thinned maltodextrins will prove useful with the present invention. Thinned derivatized starches are also suitable for practice of the invention. Suitable starch derivatives include those such as starch ethers, starch esters, cross linked starches, oxidized starches and chlorinated starches.

Preferred materials include hydroxyalkyl starch ethers including hydroxyethyl and hydroxypropyl starch ethers and particularly enzyme thinned hydroxyethyl starch ethers. A particularly preferred starch material is a thin, lightly oxidized hydroxyethyl corn starch ether available commercially as Pencote ® (Penford Products, Inc., Cedar Rapids, Iowa). According to a procedure for manufacturing such a starch, the pH of a slurry of starch is raised to 11.0 and the starch is hydroxyethylated. Hypochlorite is added at a level of 0.6–0.8% (available chlorine based on starch weight). The reactor is then held at 95°–105° F. for two hours and is followed by an acid thinning step. The granular starch is then neutralized, thoroughly washed and filtered. The oxidation serves to lower the protein content of the starch, not only improving the purity, but also bleaching the material white. An especially preferred starch material is a lightly oxidized hydroxyethyl starch such as Pencote ® which has been gelatinized and enzyme thinned to yield a highly thinned starch with an intrinsic viscosity less than 0.12 dl/g. According to one method, a slurry of lightly oxidized hydroxyethyl starch (Pencote ®) which has an intrinsic viscosity of about 0.23 dl/g is cooked at about 37% solids (dry substance basis) to gelatinize the starch and thinned with 0.01–0.02% alpha-amylase at a temperature of 88° C. for about 90 minutes. Hypochlorite solution is added to the cooked thinned material to deactivate the enzyme. The starch material to thinned is characterized by an intrinsic viscosity of about 0.077 dl/g and may be cooled and used in a reaction to produce a high solids, low viscosity, stable polymeric dispersion.

Another preferred material is an underivatized enzyme thinned starch which can be produced from an unmodified corn starch slurry having a solids content of between 10 and 45% and preferably between 35 and 45% The slurry first can be refined (i.e., residual proteins removed and the starch whitened) by adding a sodium hypochlorite solution containing from 0.1 to 1.0% (with 0.6 to 0.8% preferred) available chlorine based on the starch dry substance. This mixture is allowed to react for one hour or more, with a reaction time of 2 hours being preferred. Residual available chlorine can then be removed by addition of a small amount of sodium metabisulfite, and the slurry can be washed and filtered or centrifuged.

The starch can be dried for later use or reslurried and used immediately. In either case, the starch is slurried to a solids content of about 20 to 45%, with a solids content of 30 to 40% being preferred. The enzyme, usually an alpha-amylase, is then added to the starch slurry. The amount of enzyme will depend on the final solids and viscosity desired, with an enzyme level of 0.005 to 0.1% being preferred and a level of 0.03 to 0.05% being especially preferred. This starch/enzyme slurry is then slowly added to heated water at a rate such that the final desired solids and viscosity are obtained. After addition of the starch/enzyme slurry is complete, and the final viscosity has been obtained, the enzyme is deactivated. The mixture continues to cook until the starch is completely hydrated and dispersed. The paste is then cooled to about 37° C. and used immediately in a starch graft copolymerization reaction.

Applicants have discovered that grafting efficiency and stability of the aqueous dispersion are generally both improved at lower solids levels and with thinner starches characterized by lower intrinsic viscosities. Accordingly, to improve grafting efficiency for a given reaction system, one can lower the solids level of reaction or thin the starch component or both.

SUITABLE MONOMERS

The present invention is based upon the surprising discovery that 1,3-butadiene (alternatively referred to herein as butadiene) can be grafted with a high rate of grafting efficiency onto a gelatinized, thinned starch. 1,3-Butadiene alone can be grafted to starch or it can be grafted with one or more additional vinyl grafting monomers other than 1,3-butadiene. The general methods of the invention are also expected to be useful in the grafting of other vinyl monomers which are dienes to starch. Such diene monomers which are, in general, more reactive than 1,3-butadiene include isoprene, chloroprene, cyclobutadiene and divinyl benzene. Suitable vinyl monomers which can be cografted with 1,3-butadiene include alkyl acrylates, hydroxylated alkyl acrylates, alkyl methacrylates, hydroxylated alkyl methacrylates, alkyl vinyl ketones, substituted acrylamides, methacrylic acid, crotonic acid, itaconic acid, fumaric acid, maleic acid, maleic anhydride, vinyl halides, vinylidene halides, vinyl esters, vinyl ethers, vinyl carbazole, N-vinyl pyrrolidone, vinyl pyridene, chlorostyrene, alkyl styrene, ethylene, propylene, isobutylene, vinyl triethoxy silane, vinyl diethylmethyl silane, vinyl methyl dichloro silane, triphenyl vinyl silane, 1-vinyl-1-methyl-sila-14-crown-5. Preferred vinyl monomers include methyl methacrylate, vinyl acetate, acrylonitrile, acrylic acid, acrylamide, maleic anhydride, monovinyl silicon compounds including vinyl trimethyl silane, with vinylidene chloride, butyl vinyl ether and styrene being particularly preferred, and styrene being most preferred. Particularly preferred is the use of 1,3-butadiene monomer in combination with styrene monomer to form a graft copolymer with starch. It is to be understood that the vinyl monomers used according to the present invention may comprise 1,3-butadiene in combination with more than one additional vinyl grafting monomer. Particularly preferred vinyl monomers for use in combination with 1,3-butadiene and styrene monomers, for example, are acrylamide, acrylic acid and maleic anhydride.

CHAIN TRANSFER AGENTS

Conventional chain transfer agents, known to the synthetic rubber industry as "modifiers" may be employed to regulate the molecular weight of the polymer formed. Suitable chain transfer agents include materials such as n-dodecyl mercaptan, n-cetyl mercaptan, bromoform, carbon tetrachloride and the like in amounts ranging from 0.01 to about 5 percent of the monomer weight, with 0.10 to about 1% being preferred.

INITIATORS

Initiators (catalysts) suitable with the present invention include those materials which act to initiate free radical polymerization on the derivatized and/or thinned starches to the substantial exclusion of formation of ungrafted homo- or copolymers of the 1,3-butadiene and vinyl monomers utilized according to the invention. Such initiators include organic and inorganic peroxy compounds, azo compounds and persulfate compounds. Hydrogen peroxide and persulfate ion free radical initiators are preferred, with potassium persulfate being particularly preferred for use according to the methods of the present invention. Persulfates may be used in amounts of at least about 0.1% of the weight of monomers used, but is preferably used in a range of from about 1% to about 10%. The persulfate initiator may be used alone or in a mixture with other oxidants In addition, the initiator can be added at once or over the polymerization time.

It is sometimes the case that reducing agents are required to activate the decomposition of the above-identified free-radical initiators. Suitable reducing agents may include ferrous ammonium sulfate, ascorbic acid, sodium bisulfite, sodium metabisulfite and sodium thiosulfate. These reducing agents can be added at once at the beginning of the reaction or during the course of grafting.

SURFACTANTS

Surfactants can be used to stabilize the grafted starch dispersion and can be added either before grafting or after the grafting is complete. Suitable types of surfactants include anionic, cationic, amphoteric and non-ionic surfactants, with anionic surfactants being preferred. Cationic surfactants are generally not used alone but can be combined with other surfactants. Care should be used in selecting the surfactant such that it not interfere with the graft copolymerization reaction or with the use of the final grafted dispersion in the paper coating such as by flocking the clay or providing undesirable viscosity in the dispersion. Anionic surfactants are preferred, with dodecyl benzene sulfonic acid, sodium salt (sodium dodecyl benzene sulfonate) being particularly preferred. Surfactants may generally be used at levels up to about 10% of the monomer weight, with a level of about 1 to 5% being preferred for use of sodium dodecyl benzene sulfonate.

REACTION CONDITIONS

Typically, the polymeric dispersions of this invention consist of monomers grafted to a thinned starch in the presence of a free radical initiator. One or more surfactants can be added to the mixture. The starches used in this invention are gelatinized by cooking at a solids content of between 20 and 40% (dry basis), with a solids content of between 30 and 35% being especially preferred. The cooked, gelatinized, thinned starch paste is then placed in a reaction vessel capable of containing and withstanding the pressure of the reaction Because of the relatively high volatility of 1,3-butadiene, it is grafted under pressure. In general, the more 1,3-butadiene present in the reaction mixture, the higher the pressure at which the reaction is run. Maximum pressures during the reaction are generally between 25 and 300 psig (or more), with maximum pressures usually in a range of 40 to 70 psig.

One or more surfactants can be added at any time. Preferred amounts, when added, range to as high as 10% based on the total monomer weight, with amounts ranging from 1 to 5% being especially preferred.

The free radical initiator or initiators can be added at any time during the process. A preferred method of free radical initiator addition would have from 2 to 10% (based on total monomer weight) added to the starch prior to monomer addition, with from 0 to 4% (based on total monomer weight) being added in increments during the reaction. Especially preferred would be the addition of 80% of the total free radical initiator at the beginning of the reaction and the remaining 20% from 1 to 6 hours after the start of the reaction.

The total monomer to starch weight ratio in the aqueous dispersion is between about 2:10 and about 23:10 with a ratio of at least 5:10 being preferred and a ratio of between about 6:10 and 8:10 being most preferred. 1,3-Butadiene can be grafted to gelatinized starch alone or in the presence of other vinyl monomers. When 1,3-butadiene and styrene are used as the monomers, the amount of 1,3-butadiene ranges from at least 10% and preferably up to about 70% by weight of the graft copolymer Most preferably, the 1,3-butadiene is present at weight concentrations of from about 20% to about 40% in combination with styrene in concentrations of from about 60% to about 80%. Most preferred is the monomer mixture comprising 30% 1,3-butadiene and 70% styrene by weight. The monomer or monomers can be added at the beginning or during the course of polymerization, depending on reaction conditions. The monomers are preferably added after the addition of the surfactant and the free radical initiator. Preferably, the less volatile reactants are added first and the more volatile reactants are added last.

The graft copolymerization reaction can be carried out over a wide temperature range depending on the type of monomers and initiators used. Normally the temperatures would range from 25 to 120° C., with a grafting temperature range of 50 to 90° C. being preferred. The reaction mixture is preferably stirred while it undergoes heating.

The grafting time ranging from about 0.5 to 24 hours after addition of the initiator is usually adequate to produce a final grafted starch dispersion with low unreacted monomers. In particular, a reaction time of from about 2 to about 7 hours has been found to be particularly preferred for production of suitable product.

It is desired that the presence of residual monomers be minimized in the final grafted product. Accordingly, a post reaction treatment may be necessary. The use of steam-vacuum distillation has been found to lower residual styrene concentrations while providing a product with lower viscosity and higher solids. Another method comprises carrying out grafting at 70° C. for three hours and then at 90° C. for two hours with steam vacuum distillation. Another method comprises use of a jet cooker to efficiently remove residual monomer.

The present invention is based on the surprising discovery that 1,3-butadiene can be grafted to starch with extremely high efficiency, both in the presence and absence of other vinyl monomers. This highly efficient grafting results in a product with low levels of unpolymerized monomer and free of substantial amounts of ungrafted homopolymer which can result in grit and coagulum adversely affecting the qualities of the aqueous polymeric dispersion and the economics of its production Accordingly, the invention provides stable aqueous polymeric dispersions of grafted 1,3-butadiene starch copolymers which are substantially free of coagulum and which, as a consequence of high grafting efficiency, are characterized by weight ratios of extractable vinyl monomers and polymers to unextractable solids comprising grafted starch of 0.2 or less and preferably 0.1 or less. Most preferred are styrene/1,3-butadiene grafted starch copolymers which have been found by applicants to have weight ratios of extractable monomers and polymers to unextractable solids as low as 0.005.

GENERAL PROPERTIES OF THE DISPERSION

The properties of the dispersion of the invention both as an emulsion by itself and in combination with clay and other coating ingredients make the dispersion particularly useful. The dispersion disperses very well in water and remains in suspension without separating or settling, even in very dilute solutions. Laboratory samples of preferred dispersions exhibit no separation when kept for more than 6 months. Also, the dispersions exhibit very white color and low odor.

In addition, the viscosity of many of the dispersions is low. Viscosities of the dispersions produced from unsubstituted and unmodified enzyme thinned starch pastes are especially low relative to those of prior art dispersions made using unsubstituted, unmodified cooked starch pastes. While the viscosity of some dispersions of the invention is high (particularly those produced from less thinned starch materials), they tend to maintain a constant viscosity. This is in contrast with less stable dispersions which are characterized by low viscosities when produced but which increase rapidly in viscosity as they age.

The dispersions of this invention show good properties when incorporated in typical coating color formulations. Good mixing and dispersing properties are provided over the entire commercial range of binder to clay ratios. The finished coating colors show good stability, clay compatibility and final viscosity. Moreover, even those dispersions produced from highly thinned starches having intrinsic viscosities of less than 0.12 dl/g lend surprisingly good binding properties to paper coatings as reflected in high IGT coating strength levels for paper coated therewith. These dispersions can also show the unexpected result that when they are mixed with clay, the mixture can exhibit a lower viscosity than the original dispersion. In comparison, other commercial binders usually show a higher viscosity when mixed with clay.

Water holding properties of finished coating colors comprising the dispersions of the invention are good and often require no adjuncts such as the small amounts of carboxymethylcellulose used in some coating formulations. The coating colors exhibit good runability in application and drying and coating weights from 1 to 30 lbs. per 3,300 square feet per side may be applied with good results. The term "calender" as used in this description is meant to indicate a device normally used to produce a higher gloss in coated paper following the application and drying of the coating. It can mean supercalender, gloss calender, soft calender, thermofinisher or any device used to develop said gloss.

Coating color compositions using the dispersions of this invention to replace styrene/1,3-butadiene (S-B) latex, starch and blends thereof produce the high glosses required for certain paper coating grades. In an all S-B latex formula, substituting the latex portion with the dispersions of the invention results in the retention of high gloss levels. Substitution of the starch portion with the dispersions of the invention enhances gloss properties in formulas combining S-B latex and starch without sacrificing those properties usually attributed to the starch. In a lightweight coating comparison, replacement of the starch portion with the dispersion of the invention results in significant increases in paper gloss. In an enamel grade formula, replacement of the starch portion with the dispersion of the invention also results in a significant increase in gloss. Unlike other starches that show a relatively low gloss in coating formulations, dispersions of the present invention show improved gloss in such formulations. The aqueous dispersions of the present invention are capable of providing paper with a calendered gloss of 55% and up to 70% or greater when the dispersion is applied to 53 pound base stock paper at a rate of 6 pounds per 3,300 feet per side in the form of a coating color comprising 16-18 parts of the dispersion and 100 parts clay. The dispersion is also capable of providing the paper, treated as above, with an IGT of 175 feet per minute up to greater than 250 feet per minute when measured with no. 3 tack ink.

EXAMPLES

In Examples 1 through 7, butadiene and vinyl monomers were grafter to a thinned starch using a $H_2O_2$—$Fe^{2+}$ initiator. The resulting dispersions were used as binders in paper coating compositions. Styrene, 1,3-butadiene and other chemicals were used throughout as obtained commercially, without removal of inhibitors or further purification.

Example 1

A thin, derivatized starch was reacted in a one liter pressure reactor with styrene and butadiene monomers in the presence of an $H_2O_2$—$Fe^{2+}$ initiator to produce a stable aqueous polymeric dispersion. Specifically, a thin, lightly oxidized hydroxyethyl corn starch (Pencote®, Penford Products, Inc., Cedar Rapids, Iowa) was cooked at a 30% solids content in a laboratory cooker for 1 hour. The cooked starch was then cooled to room temperature. According to this procedure, about 150 g dry basis of the cooked starch paste wash charged to a 1 liter pressure reactor (Parr instrument) followed by a small amount of ferrous ammonium sulfate (FAS) and surfactant (Tween 80) dissolved in 150 ml of water. The mixture was stirred for about 5 minutes and then $H_2O_2$ (30% by weight), dissolved in 45 ml of water was added. The monomers were then added at a 50:50 (by weight) styrene to 1,3-butadiene (S-B) ratio. Batches were run with 2, 4, 6, 7, 8 and 10 parts total monomer per 10 parts starch (See Table 1) The amount of Tween 80 and $H_2O_2$ used was 3.4 and 1.67 parts, respectively, per 100 parts of monomers. FAS was used in an amount according to the FAS/$H_2O_2$ ratio of 0.15. After adding $H_2O_2$, the reactor was heated to about 50° C. and held at this temperature for 20 hours while stirring. Maximum pressures of 45 psig to 60 psig were observed. The reactor was then allowed to cool to room temperature and the pH adjusted to 6 to 7 with aqueous $NH_4OH$.

Example 2

According to this example, paper coating compositions were produced utilizing the binder materials from Example 1. These coating colors were then applied to paper and the resulting properties attributable to each coating composition were determined. A typical coating formula included:

| Composition | Parts |
| --- | --- |
| No. 1 delaminated clay (Nuclay) | 100 |
| Grafted starch | 16 |
| Total solids | 55–60% |
| pH | 8.3–8.8 |

The paper coating compositions or coating colors were prepared by mixing the grafted starches with a 70% solids clay slip and then adjusted to pH of 8.3–8.8. The clay slip was prepared by adding Nuclay (Englehard) to tap water containing a 0.2% polyacrylate/NaOH dispersant (42% solids) on the clay (commercial solids basis). Dispersion for the clay slip was provided by mixing 15 minutes at 1400 rpm with a Cowles blade mixer. After adding the dispersions produced from Example 1 to the clay slip and adjusting the pH with ammonium hydroxide, the coating colors were thoroughly mixed.

The finished coating colors were applied to 35–53 pound base stock at room temperature using a bench size trailing blade coater (Euclid Tool & Machine) at 5.7–6 3 pounds per 3,300 square feet per side. All coated papers were immediately dried in an infrared dryer (CCR Enterprises) at a gauge temperature of 170° F. for 6 seconds and then conditioned at 50% relative humidity and 75° F. The coated papers were then supercalendered at 150° F. and 1,000 lb/linear inch with 4 to 8 nips. The gloss of the finished coated paper was determined using a gloss meter, (Photovolt, Model 577). Ten gloss readings were made on the wire side of each sheet The results shown in Table 1 indicate that increasing the amount of monomers from 2 to 6 parts (per 10 parts of starch) gradually increased the gloss from 51.7 to 53.8. At levels greater than 6 parts monomer per 10 parts starch, increasing the amount of monomer resulted in a substantial increase in the gloss of coated paper. Only slight increases in gloss were noted when the level of monomer approached 10 parts per 10 parts starch.

TABLE 1

Gloss Obtained Using Various Levels of Styrene-1,3-Butadiene[1][2]

| Run No. | Parts of Monomer by 10 pts. of Starch | Visc. After Mixing With Clay[3] (cps) | Gloss (%) |
|---|---|---|---|
| 2A | 0 | 1,450 | 54.0 |
| 2B | 2 | 5,900 | 51.7 |
| 2C | 4 | 4,200 | 52.8 |
| 2D | 6 | — | 53.8 |
| 2E | 7 | — | 58.3 |
| 2F | 8 | 950 | 59.3 |
| 2G | 10 | — | 59.6 |

[1] Grafting conditions: monomers (50% styrene and 50% 1,3-butadiene by wt.), temp. = 50° C., time = 20 hrs.
[2] Base stock used was 35 pounds per 3,300 square feet with a 5.8% gloss.
[3] Viscosity was measured at 25° C. with Brookfield viscometer, spindle #4 at 20 rpm.

Example 3

In this example, the ratios of styrene to 1,3-butadiene were varied. Styrene and 1,3-butadiene monomers were grafted to starch according to the procedure of Example 1. Specifically, 90 parts of monomer were grafted to 150 parts of starch with 1.50 parts $H_2O_2$, 0.225 parts FAS and 3.06 parts Tween 80. The ratio of styrene to 1,3-butadiene in the reaction mixture was varied from 0 to 100%. The products were then incorporated as binders into paper coating compositions and used to coat paper according to the method of Example 2. The results of variations of these components on the gloss property of the coated paper are reported in Table 2. While 100% styrene gave very good gloss, the binding strength appeared to be low.

TABLE 2

Gloss Obtained With Various Ratios of Styrene-1,3-Butadiene

| Run No. | Amt. of Styrene in the Styrene-1,3-Butadiene Mix (%) | Visc. After Mixing With Clay (cps) | Gloss (%) |
|---|---|---|---|
| 3A | 0 | — | 42.8 |
| 3B | 30 | 1100 | 55.8 |
| 3C | 50 | — | 53.8 |
| 3D | 60 | — | 56.3 |
| 3E | 70 | 1400 | 57.7 |
| 3F | 100 | 700 | 61.6 |

Base stock used was 35 pounds per 3,300 square feet.

Example 4

According to this example, styrene, 1,3-butadiene and either acrylic acid or maleic anhydride monomers were grafted to starch according to the procedure of Example 1. Again, 90 parts of monomer were grafted to 150 parts of starch with 1.50 parts $H_2O_2$, 0.225 parts FAS and 3.06 parts Tween 80. Either acrylic acid or maleic anhydride were added at levels ranging from 0 to 10% by weight of the monomer mixture. The products were then incorporated into paper coating compositions and used to coat paper according to the method of Example 2.

Tables 3 and 4 illustrate the use of acrylic acid and maleic anhydride in the graft copolymerization of styrene and butadiene with the Pencote ® starch. Good gloss was obtained with coating materials comprising graft copolymers having acrylic acid or maleic anhydride incorporated therein.

TABLE 3

Acrylic Acid in the Monomer Mixture

| | Monomer Composition | | | |
|---|---|---|---|---|
| Run No. | Styrene (%) | 1,3-Butadiene (%) | Acrylic Acid (%) | Gloss (%) |
| 4A | 60 | 40 | 0 | 56.3 |
| 4B | 59 | 39 | 2 | 58.72 |
| 4C | 57.5 | 37.5 | 5 | 58.10 |
| 4D | 55 | 35 | 10 | 54.72 |

Base Stock used was 35 pounds per 3,300 square feet.

TABLE 4

Maleic Anhydride in the Monomer Mixture

| | Monomer Composition | | | Visc. After | |
|---|---|---|---|---|---|
| Run No. | Styrene (%) | 1,3-Butadiene (%) | Maleic Anhydride (%) | Mixing With Clay (cps) | Gloss (%) |
| 4E | 60 | 40 | 0 | — | 56.3 |
| 4F | 59 | 39 | 2 | 4,920 | 54.0 |
| 4G | 57.5 | 37.5 | 5 | 7,500 | 55.6 |
| 4H | 55 | 35 | 10 | 8,000 | 59.2 |

Base stock used was 35 pounds per 3,300 square feet.

Example 5

According to this example, styrene, 1,3-butadiene and acrylonitrile monomers were grafted to starch with acrylonitrile substituted for styrene at various levels. The monomers were grafted to the starch according to the procedure of Example 1. Specifically, 90 parts of monomer were grafted to 150 parts of starch with 1.50 parts $H_2O_2$, 0.225 parts FAS and 3.06 parts Tween 80. The products were then incorporated into paper coating compositions and used to coat paper according to the method of Example 2. Table 5 shows the gloss obtained with coating materials having acrylonitrile incorporated into the styrene/1,3-butadiene copolymer.

TABLE 5

Acrylonitrile in the Monomer Mixture

| | Monomer Composition | | Acrylonitrile (%) | Visc. After Mixing With Clay (cps) | Gloss (%) |
|---|---|---|---|---|---|
| Run No. | Styrene (%) | 1,3-Butadiene (%) | | | |
| 5A | 70 | 30 | 0 | — | 57.7 |
| 5B | 50 | 30 | 20 | 2000 | 59.0 |
| 5C | 35 | 30 | 35 | 3060 | 53.8 |
| 5D | 20 | 30 | 50 | 3600 | 54.5 |
| 5E | 0 | 30 | 70 | 3400 | 56.3 |

Base stock used was 35 pounds per 3,300 square feet.

Example 6

According to this example, the effects of various grafting reaction times are shown. Styrene and 1,3-butadiene monomers were grafted to starch according to the procedure of Example 1. Specifically, 90 parts of monomer comprising 60% styrene and 40% 1,3-butadiene by weight were added to 150 parts of starch with 1.50 parts $H_2O_2$, 0.225 parts FAS and 3.06 parts Tween 80. The grafting reactions were carried out at 50° C. for from 5 to 20 hours. The products were then incorporated into a paper coating compositions and used to coat paper according to the method of Example 2. The results are illustrated in Table 6.

TABLE 6

Results of Reaction Time at 50° C.

| Run No. | Reaction Time (Hours) | Visc. After Mixing With Clay (cps) | Gloss (%) |
|---------|----------------------|-----------------------------------|-----------|
| 6A | 5 | 1800 | 63.2 |
| 6B | 10 | 1500 | 60.1 |
| 6C | 15 | 1350 | 61.5 |
| 6D | 20 | — | 56.3 |

Base stock was 35 pounds per 3,300 square feet.

Example 7

In this example, the effect of reaction time on efficiency of grafting was studied. Styrene-1,3-butadiene monomers were grafted to Pencote ® starch in a small scale reactor with $H_2O_2$—$Fe^{2+}$ as the initiator. According to this example, twenty grams dry weight of Pencote ® starch paste (solids content=30%) was charged to a 250 ml Wheaton bottle with a rubber lined screw cap. Then 0.03 g of ferrous ammonium sulfate (FAS) dissolved in 5 ml water was added, followed by 0.4 g surfactant (Tween 80) in 17 ml water. The mixture was stirred for 5 minutes. Styrene (7.2 g) and 1,3-butadiene (4.8 g) were added. Then 0.67 g of 30% aqueous hydrogen peroxide in 5 ml water was immediately added to the bottle. The bottles were tied and clamped to a wrist type action Burrell shaker and shaken at 50° C. for a time period of 5, 10, 15 and 20 hours. After the grafting reactions, the mixtures were allowed to cool to room temperature and poured into one liter beakers and diluted with 100 ml of water. Then 300 ml of isopropanol was slowly added into the grafted starch dispersions with stirring. The grafted starch precipitated out. The contents were filtered through Whatman filter paper no. 1 with vacuum. The cakes were air dried in a ventilated hood overnight and then extracted with tetrahydrofuran (THF) for 3 days in a Soxhlet extractor. The oven dry weights of the starch after graft-copolymerization and THF extraction were recorded and used in the calculations of the ratio of extractable vinyl grafting monomer(s) and polymer(s) thereof/unextractable solids comprising grafted starch and grafting efficiency.

The extraction procedure removes vinyl grafting monomer(s) and ungrafted polymers thereof but does not extract ungrafted starch, grafted starch or cross-linked grafted starch. In addition, it may not remove all of any ungrafted cross-linked polymer of the grafting monomers. Nevertheless, the weight ratio of extractable grafting monomer(s) and polymers thereof to unextractable solids (also referred to herein as the "ratio of extractable monomers and polymers/unextractable solids" or the "extractable/unextractable ratio") provides an extremely reliable analytical tool for determining grafting efficiency and product quality. The calculations of the ratio of extractable monomers and polymers to unextractable solids and of grafting efficiency are set out below.

T = dry weight of the grafted product before extraction.
GS = dry weight of the unextractable solids after extraction.
OS = dry weight of the starch before grafting.
M = weight of monomer(s) used.
Ad = dry weight of the additives used in the grafting reaction, i.e., surfactant, initiator.
Amount of extractable monomer(s) and polymers, UP: UP = T - GS
Amount of grafted polymer and unextractable cross-linked polymer, GP: GP = GS − (OS + Ad)
Ratio of extractable vinyl grafting monomer(s) and polymers thereof/unextractable solids =

$$\frac{UP}{GS}$$

Grafting efficiency, $$\% = \frac{GP}{M} \times 100$$

The results are shown in Table 7.

It should be noted that the presence of quantities of unextractable polymers of said grafting monomers in a product such as may result from cross-linking of such polymers will lower the extractable/unextractable ratio by increasing the denominator and reducing the numerator of that ratio. Nevertheless, the presence of large quantities of ungrafted cross-linked polymer of the grafting monomer(s) will be apparent from the presence of grit and coagulum in the dispersion formed by that product as well as by the possible instability of the dispersion of that product. Similarly, where the vinyl monomer is 1,3-butadiene or another volatile gas, the extractable/unextractable ratio may be unrealistically low in cases where the volatile monomer fails to fully react but remains a gas. In such cases, the unreacted monomer is unavailable for weighing of the grafted product before extraction. Cases exhibiting such poor grafting efficiency may readily be determined by the venting of vinyl monomer from the grafting reactor and by the generally lower solids content of products resulting from such reactions.

TABLE 7

Effect of Reaction Time on Grafting Styrene-1,3-Butadiene Monomers

| Reaction Time (Hours) | Extractable/ Unextractable Ratio | Grafting Efficiency (%) |
|-----------------------|----------------------------------|-------------------------|
| 5 | 0.230 | 50.0 |
| 20 | 0.040 | 88.5 |
| 15 | 0.010 | 97.2 |
| 20 | 0.005 | 98.6 |

In the following examples, 1,3-butadiene, styrene and other monomers were grafter to starch using potassium persulfate ($K_2S_2O_8$) as an initiator. Binder compositions so produced were incorporated into paper coating compositions and were evaluated for their paper coating qualities.

Example 8

In this example, Pencote ®, a thin, lightly oxidized hydroxyethyl starch ether was reacted in a one liter pressure reactor (Parr Instruments) with styrene and 1,3-butadiene monomers in the presence of a potassium persulfate initiator to produce a stable aqueous polymer dispersion according to the invention. Pencote ® starch was cooked at 30% solids in a laboratory cooker for one hour according to the method of Example 1. Specifically, 500 grams of the cooked, cooled paste was added to a one liter pressure reactor (Parr Instruments), followed by 3 grams Tween 80 as the surfactant and approximately 190 grams of water. To this mixture was added 1.8 to 9.0 grams of water. To persulfate (2 to 10% based on monomers) as the initiator. The mixture was stirred for about five minutes and then 54 grams of styrene and 36 grams of 1,3-butadiene were added. The grafting reactions were then carried out for 10 hours at 70° C. The resulting products were then incorporated as binders into paper coating compositions and used to coat 35 pound base stock according to the method of Example 2, with calendering at 7 nips. Table 8 shows the gloss of the coated paper when various levels of potassium persulfate were used.

TABLE 8

Effect of $K_2S_2O_8$ Concentration of Properties of Coated Paper

| Run No. | Amount of $K_2S_2O_8$ Used, Based on Monomers (%) | Viscosity After Grafting[1] (cps) | Viscosity After Mixing With Clay[2] (cps) | Gloss (%) |
|---|---|---|---|---|
| 8A | 2 | 3900 | 1630 | 54.9 |
| 8B | 5 | — | 1180 | 58.8 |
| 8C | 7 | 2120 | 2380 | 52.3 |
| 8D | 10 | 860 | 1900 | 54.8 |

[1]Viscosity measured with Brookfield spindle #5 at 20 rpm.
[2]Viscosity measured with Brookfield spindle #4 at 20 rpm.

Example 9

In this example, the grafting of styrene and 1,3-butadiene monomers to Pencote® lightly oxidized hydroxyethyl starch in the presence of a potassium persulfate ($K_2S_2O_8$) initiator was carried out in a small scale reactor according to the method described in Example 7. Specifically, 66.7 grams of Pencote® starch paste (30% d.s.) was added into a reaction bottle with 0.4 grams of Tween 80 surfactant in 17 ml water and 12 grams of monomer comprising 7.2 grams styrene and 4.8 grams of 1,3-butadiene. Various levels, based on total monomer, [1% (0.12 g), 2% (0.24 g), 5% (0.60 g) or 10% (1.20 g)] of potassium persulfate catalyst were dissolved in 10 ml of water and added to the starch/monomer mixture. The mixture were then reacted at 50°) C. for 20 hours. Table 9 shows the effect of $K_2S_2O_8$ concentration on the grafting efficiency and the ratio of extractable monomers and polymers to the unextractable solids. The grafting efficiency steadily increased with the increase in $K_2S_2O_8$ concentration (from 1 to 5%). At the same time, the ratio of extractable monomers and polymers to unextractable solids decreased with increased $K_2S_2O_8$ concentration.

TABLE 9

Effect of $K_2S_2O_8$ Concentration on Grafting Styrene-1,3-Butadiene Monomers

| Run No. | $K_2S_2O_8$ Concentration (% Based on Monomers) | Extractable/ Unextractable Ratio | Grafting Efficiency (%) |
|---|---|---|---|
| 9A | 1 | 0.104 | 74.4 |
| 9B | 2 | 0.027 | 92.8 |
| 9C | 5 | 0.008 | 97.8 |
| 9D | 10 | 0.023 | 93.8 |

Grafting conditions:
Pencote ® (30% d.s.) = 20 g dry weight;
Tween 80 = 0.4 g in 17 ml water;
Monomers = 12 g (Styrene = 7.2 g and 1,3-butadiene = 4.8 g);
Temp. = 50° C.;
Time = 20 hr;
$K_2S_2O_8$ (varied) dissolved in 10 ml of water.

Example 10

According to this example, grafting of styrene and 1,3-butadiene monomers to Pencote ® starch at 50° C., both with and without Tween 80 surfactant, was carried out. The method and conditions of Example 9 were reproduced with 0.6 g of $K_2S_2O_8$ as the initiator and reaction times varying from 5 to 20 hours at 50° C. The results are shown in Table 10.

TABLE 10

Effect of Reaction Time on Grafting Styrene-1,3-Butadiene Mixture to Starch

| Run No. | Reaction Time (hrs) | Surfactant | Extractable/ Unextractable Ratio | Grafting Efficiency (%) |
|---|---|---|---|---|
| 10A | 5 | Tween 80 | 0.380 | 24.3 |
| 10B | 10 | Tween 80 | 0.094 | 76.4 |
| 10C | 15 | Tween 80 | 0.031 | 91.8 |
| 10D | 20 | Tween 80 | 0.008 | 97.8 |
| 10E | 5 | — | 0.354 | 29.0 |
| 10F | 10 | — | 0.036 | 90.6 |
| 10G | 15 | — | 0.004 | 99.0 |
| 10H | 20 | — | 0.020 | 94.7 |

Example 11

This example illustrates the use of different surfactants with a potassium persulfate initiator when grafting styrene and 1,3-butadiene monomers to starch. A 500 gram quantity of starch (32% d.s. Pencote ®) was reacted with a quantity of monomers 80% its weight comprising 70% styrene (89.6 grams) and 30% 1,3-butadiene (38.4 grams) with water (206.5 grams), and 5% potassium persulfate (6.4 grams). Varying amounts of surfactants were used. The mixture, having a solids content of 35.5% was grafted at 70° C. for 10 hours. After the grafting reaction, 0.128 grams sodium methyldithiocarbamate with 12.4 grams of water was added to the grafted mixture. The pH was adjusted to pH 5.5–6.0 with ammonium hydroxide, except 11L which was 7.6. The resulting products were then incorporated as binders into paper coating compositions prepared and used to coat 53 pound base stock with calendering at 6 nips according to the method of Example 2.

Varying types and amounts of surfactants were used in carrying out the reaction above. Specifically, test runs were performed using a non-ionic surfactant (Tween 80); an anionic surfactant [dodecylbenzene sulfonic acid, sodium salt (DBSA)], a cationic surfactant (cetylmethyl ammonium chloride (CTAC)) and mixtures of DBSA and CTAC. Characteristics of the graft copolymer and of paper coated with coating compositions comprising the materials are shown in Table 11. The results indicate the suitability of a large variety of surfactants for providing binders according to the invention which develop high gloss in a paper coating.

TABLE 11

Results of Using Various Surfactants

| Run No. | Type of Surfactant | Amount of Surfactant (%) | Viscosity After Grafting (cps) | Viscosity After Mixing With Clay (cps) | Gloss (%) |
|---|---|---|---|---|---|
| 11A | Tween 80 | 2 | 9,680 | 1,900 | 66.9 |
| 11B | Tween 80 | 5 | 6,000 | 2,400 | 69.7 |
| 11C | Tween 80 | 7 | 13,320 | 2,100 | 69.8 |
| 11D | Tween 80 | 10 | 12,400 | 1,700 | 70.9 |
| 11E | DBSA | 2 | 8,240 | 1,400 | 68.8 |
| 11F | DBSA | 5 | 2,880 | 800 | 70.6 |
| 11G | DBSA | 7 | 10,000 | 1,500 | 71.3 |
| 11H | DBSA | 10 | 11,920 | 1,700 | 72.0 |
| 11I | CTAC | 2 | 16,360 | 3,800 | 67.1 |
| 11J | CTAC | 5 | — | — | Coagulated with Clay |
| 11K | CTAC | 7 | — | — | Coagulated with Clay |
| 11L | CTAC | 10 | — | — | Coagulated with Clay |
| 11M | DBSA/CTAC | 2 | 10,560 | 3,500 | 73.8 |
| 11N | DBSA/CTAC | 5 | 8,200 | 1,300 | 17.8 |

Base stock used was 53 pounds per 3,300 square feet with a 6.6% gloss and a Sheffield smoothness of 243.

Example 12

According to this example styrene/1,3-butadiene copolymer grafted starches with various levels of total monomer were prepared utilizing a potassium persulfate initiator according to the method of Example 11. Experimental runs were conducted both with and without surfactant, with DBSA used in surfactant runs at a level of 5%. The grafted starches were used as binding materials in paper coating compositions and applied to paper stock and evaluated according to the methods of Example 11. The results of the test runs are shown in Table 12.

TABLE 12

Results of Varying Styrene-1,3-Butadiene Concentration on the Properties of Coated Paper

| Run No. | Parts of S-B Monomers by 10 Pts Starch | Surfactant | Viscosity After Grafting (cps) | Viscosity After Mixing With Clay (cps) | Gloss[1] (%) |
|---|---|---|---|---|---|
| 12A | 2 | — | 8,200 | 1,420 | 59.8 |
| 12B | 4 | — | 9,240 | 2,500 | 60.0 |
| 12C | 6 | — | 16,240 | 2,850 | 63.3 |
| 12D | 8 | — | 13,680 | 2,250 | 64.1 |
| 12E | 10 | — | 15,400 | 1,900 | 66.5 |
| 12F | 2 | 5% DBSA | 20,200 | 2,800 | 59.6 |
| 12G | 4 | 5% DBSA | 3,400 | 1,600 | 63.3 |
| 12H | 6 | 5% DBSA | 2,440 | 1,000 | 72.1 |
| 12I | 8 | 5% DBSA | 2,880 | 800 | 70.6 |
| 12J | 10 | 5% DBSA | 2,640 | 1,400 | 72.1 |

[1]Base stock used was 53 pounds per 3,300 square feet.

Example 13

According to this example styrene/1,3-butadiene copolymer grafted starches with various ratios of styrene to 1,3-butadiene were prepared utilizing a potassium persulfate initiator according to the method of Example 11. Experimental runs were conducted with 8 parts monomer per 10 parts starch with 5% DBSA surfactant, 5% potassium persulfate initiator and with a reaction time of ten hours at a temperature of 70° C. The grafted starches were used as binder materials in paper coating compositions and coated onto paper stock and evaluated according to the methods of Example 11. The results are shown in Table 13.

TABLE 13

Gloss Obtained With Different Levels of Styrene

| Run No. | Amount of Styrene in the S-B Mixture (%) | Viscosity After Grafting (cps) | Viscosity After Mixing With Clay (cps) | Gloss (%) |
|---|---|---|---|---|
| 13A | 0 | 11,240 | 5,700 | 63.7 |
| 13B | 20 | 22,200 | 4,500 | 65.0 |
| 13C | 50 | 2,280 | 2,700 | 67.7 |
| 13D | 70 | 2,800 | 800 | 70.6 |
| 13E | 100 | 228 | 1,200 | 69.1 |

Base stock used was 53 pounds per 3,300 square feet.
13E was repeated with 0.5 parts carboxymethylcellulose (CMC) added and a gloss of 73.4% was obtained.

Example 14

This example compares the starch/copolymer dispersions of the invention with starch grafted to various vinyl monomers. Accordingly, vinyl monomers including methyl methacrylate, vinyl acetate, acrylic acid, acrylamide, acrylonitrile and vinylidene chloride were grafted alone or in combination with 1,3-butadiene to a thin, lightly oxidized hydroxyethyl starch (Pencote®) at a monomer to starch ratio of 80 to 100. The grafting was carried out according to the method of Example 13 at a temperature of 70° C. for 10 hours with 5% DBSA as the surfactant and 5% potassium persulfate as the initiator. The grafted starch products were used as binders in paper coating compositions and the properties of the coated papers were evaluated according to the methods of Example 11. The results are shown in Table 14.

TABLE 14

Use of Various Vinyl Monomers

| Run No. | Monomer Composition | Visc. After Grafting (cps) | Visc. After Mixing With Clay (cps) | Gloss (%) |
|---|---|---|---|---|
| 14A | 70% Styrene 30% 1,3-Butadiene | 2,880 | 800 | 70.6 |
| 14B | 100% Methyl methacrylate | 448 | 1,100 | 69.9 |
| 14C | 70% Methyl methacrylate | 22,400 | — | 65.8 |

TABLE 14-continued

Use of Various Vinyl Monomers

| Run No. | Monomer Composition | Visc. After Grafting (cps) | Visc. After Mixing With Clay (cps) | Gloss (%) |
|---|---|---|---|---|
| 14D | 30% 1,3-Butadiene<br>100% Vinyl acetate | 104 | 8,000 | 66.2 |
| 14E | 70% Vinyl acetate<br>30% 1,3-Butadiene | 1,240 | Too Viscous | Flocked the clay |
| 14F | 100% Acrylonitrile | — | — | Gelled up during grafting |
| 14G | 70% Acrylonitrile<br>30% 1,3-Butadiene | — | — | Gelled up during grafting |
| 14H | 100% Vinylidene chloride | 428 | 2,200 | 71.0 |
| 14I | 70% Vinylidene chloride<br>30% 1,3-Butadiene | 2,840 | 1,950 | 69.8 |
| 14J | 20% Vinyl acetate<br>50% Styrene<br>30% 1,3-Butadiene | 4,240 | 4,400 | 65.2 |
| 14K | 40% Vinyl acetate<br>30% Styrene<br>30% 1,3-Butadiene | 864 | Too Viscous | Flocked the clay |
| 14L | 70% Vinyl acetate<br>30% 1,3-Butadiene | 1,240 | Too Viscous | Flocked the clay |
| 14M | 0.5% Acrylic acid<br>70% Styrene<br>29.5% 1,3-Butadiene | 12,400 | 3,600 | 69.9 |
| 14N | 1% Acrylic acid<br>70% Styrene<br>29% 1,3-Butadiene | 22,160 | 6,500 | 67.8 |
| 14O | 5% Acrylic acid<br>70% Styrene<br>25% 1,3-Butadiene | >40,000 | — | 64.9 |
| 14P | 10% Acrylic acid<br>70% Styrene<br>20% 1,3-Butadiene | >40,000 | 28,500 | 63.4 |
| 14Q | 70% Styrene<br>29.9% 1,3-Butadiene<br>0.1% Acrylamide | 3,560 | 2,800 | 71.6 |
| 14R | 70% Styrene<br>29.5% 1,3-Butadiene<br>.5% Acrylamide | 4,560 | 2,200 | 71.6 |
| 14S | 70% Styrene<br>28% 1,3-Butadiene<br>2% Acrylamide | >40,000 | 8,400 | 66.9 |
| 14T | 70% Styrene<br>25% 1,3-Butadiene<br>5% Acrylamide | >40,000 | 7,000 | 64.8 |

Base stock was 53 pounds per 3,300 square feet.

Example 15

According to this example, the binder composition, 12H, prepared in Example 12 was used to prepare a coating composition and coated paper. These coated papers were then compared to paper which had been coated with a coating composition comprising a commercially available latex binder in place of the material of the invention. Paper coating compositions were prepared by mixing the product with a 70% solids clay slip as prepared in Example 2 above. The coating colors were then adjusted to a 60% solids level with tap water. Ammonium hydroxide was used for pH adjustment to 8.3-8.8. For comparison, a coating material was made using 18 parts styrene/1,3-butadiene latex (DOW 620A) and 0.5 parts carboxymethylcellulose (Hercules CMC 7L) as the binder in place of the material of the invention.

A 53 pound per 3,300 square feet unsized, uncalendered, base stock was coated with the coating compositions on a Euclid bench size trailing blade coater (Euclid Tool and Machine, Bay City, Michigan). Coating colors were applied at room temperature and immediately dried in an infrared dryer (CCR Enterprises, St. Louis, Missouri). Adjustments in coating weights were made by varying the trailing blade pressure. All coated samples were conditioned at 50% humidity and 75° F. before testing.

The coated sheets were calendered on a B. F. Perkins & Sons supercalender (Chicopee, Massachusetts). Maximum gloss was obtained at 4 to 6 nips depending on the coating composition. Calendering conditions were: roll pressure of 1000 lb/linear inch; a roll speed of 78 feet per minute and a roll temperature of 150° F.

After coating and calendering of the paper stock, it was tested for gloss, print gloss, smoothness and ink absorptivity. Gloss determinations were made by averaging roughly ten measurements per sheet for three or four coated and calendered sheets of each type on a 75° Glossgard II Glossmeter (Pacific Scientific, Silver Spring, Maryland).

Print gloss percent and percent snap were determined by making ten measurements on each of two prints made on a Little Joe Offset Color Swatching Press (Somerville, New Jersey) using Pantone 151 orange ink (Inmont Corp., Clifton, New Jersey) After printing, each printed sheet was allowed to dry before determining the percent gloss. Percent snap represents the difference or increase between initial gloss and print gloss.

Smoothness data was obtained on the Sheffield Precisionaire smoothness tester (The Sheffield Measurement Division, Dayton, Ohio) and is presented in Sheffield units. Smoothness determinations were made by averaging ten measurements per sheet on two coated and calendered sheets. High Sheffield numbers represent a rougher surface while lower numbers represent a smoother surface.

The absorptivity of the coated papers was measured by the Croda ink test. This test is conducted by smearing a thick film of Croda's Drawdown Ink #1 (Croda Inks Corp., Niles, Illinois) onto a test sheet and then removing the excess ink after waiting exactly two minutes. Deep discoloration indicates a high rate of absorption while light discoloration indicates low absorption. Run 15A had a medium discoloration, with run 15B being darker than 15A and run 15C being lighter than 15A. Run 15D was even lighter than 15C, with run 15F being lighter still than 15D. Run 15E was darker than 15D, but lighter than 15C. These results are shown in Table 15 below.

TABLE 15

| Run No. | Sample | Add On lb[(1)] | No. of Nips | Gloss (%) | Print Gloss (%) | Snap (%) | Sheffield Smoothness | Croda Ink Stain Level |
|---|---|---|---|---|---|---|---|---|
| 15A | Latex 18 pt/ 0.5 pt CMC 7L | 6 | 4 | 72.6 | 79.5 | 6.9 | 17.7 | Medium |
| 15B | Latex 18 pt/ 0.5 pt CMC 7L | 5 | 4 | 72.0 | 77.1 | 5.1 | 19.1 | Dk than 15A |
| 15C | Latex 18 pt/ 0.5 pt CMC 7L | 7.5 | 4 | 75.7 | 82.6 | 6.9 | 16.0 | Lt than 15A |
| 15D | #12H 18 pt | 6 | 4 | 67.9 | 79.5 | 11.6 | 19.5 | Lt than 15C |
| 15E | #12H 18 pt | 5 | 4 | 65.5 | 77.9 | 12.4 | 23.2 | Dk than 15D |
| 15F | #12H 18 pt | 8 | 4 | 70.4 | 82.1 | 11.7 | 18.8 | Lt than 15D |
| 15G | #12H 18 pt | 6 | 6 | 70.5 | 80.7 | 10.2 | 20.3 | — |
| 15H | #12H 18 pt | 5 | 6 | 66.6 | 76.8 | 10.2 | 25.2 | — |
| 15I | #12H 18 pt | 8 | 6 | 71.6 | 81.7 | 10.1 | 18.3 | |

[(1)]Per side per 3,300 square feet.

Example 16

In this example, an enzyme converted starch was grafted according to the procedure of the invention. Unmodified starch granules were first bleached with hypochlorite in a granular form. Specifically, a slurry of unmodified starch granules of 22.5° Be' (approximately 40% solids) was adjusted to pH 8.0 to 8.5 and allowed to react with a level of sodium hypochlorite equivalent to 0.6% available chlorine based on the starch dry substance. After two hours at 46° C., the pH was adjusted to 5.0 with HCl and then sodium metabisulfite (BSS) was added to chlorine extinction. The mixture was then diluted to 12° Be', filtered and washed thoroughly with water. The final product was then dried to about 11% moisture. This treated starch was then enzyme thinned using the following procedure: The starch was slurried to 22.5° Be' and placed in a large addition funnel. The pH was adjusted with HCl to approximately 6.5. Approximately 0.05% alpha-amylase on dry substance starch was then added. The mixture was agitated to keep the starch suspended. Sufficient water was added to a steam heated starch cooker to give, after addition of the starch slurry, a final calculated solids of 30%. The water was heated to about 195° F. (with agitation) and the starch/enzyme slurry was added just fast enough so that good mixing could be maintained. As soon as addition was completed, a small amount of hypochlorite was added (4 drops for a 1500 ml batch) to deactivate the enzyme. The temperature was then increased to about 205°-210° F. for 15 minutes to finish the cook. Final solids were about 32%.

The enzyme thinned starch was then used in place of Pencote ® starch in a grafting reaction according to the procedure used to produce sample 12H. The resulting enzyme thinned starch dispersion was then compared to the dispersion using Pencote ® starch (Sample 12H) in various coating compositions. These grafted products were used alone (at varying percentages) and in combination with other binder materials. Gloss, IGT and viscosity measurements were made for each coating composition. (See Table 16.) Specifically, the material of Example 12H comprising grafted Pencote ® starch and the grafted enzyme thinned starch from this example were used to prepare coating compositions and coated on paper according to the procedure given in Example 15. The material from Example 12H was used alone (Runs No. 16A and 16B), in combination with carboxymethylcellulose (Hercules CMC 7L) (Run No. 16C), and in combination with hydroxyethylated starch (Penford Gum 280, Penford Products Co., Cedar Rapids, Iowa) (Runs No. 16D and 16E). The grafted enzyme thinned starch was also used alone (Runs No. 16F and 16G), and in combination with starch gum (Penford Gum 280) (Run No. 16H). Tests were also conducted with coating compositions which included combinations of Dow latex 620 (Dow Chemical Co., Midland, Michigan) with carboxymethylcellulose (Hercules CMC 7L) (Run No. 17I) and with hydroxyethylated starch (Penford Gum 280) (Runs No. 16J and 16K).

The grafted enzyme thinned starch showed gloss values comparable to those of the grafted Pencote ® starch when both were used as the single binder in the coating composition of 16 parts binder to 100 parts clay. Comparable gloss values were also obtained when both were used with Penford Gum 280 as a co-binder.

TABLE 16

| Run No. | Binder Composition | | Viscosity of the Coating Colors (cps) | Gloss (%) | IGT* (ft/min) |
|---|---|---|---|---|---|
| 16A | 12H | 16 pt | 900 | 72.5 | 175 |
| 16B | 12H | 18 pt | 1,370 | 74.0 | 175 |
| 16C | 12H CMC | 18 pt 0.5 pt | 2,500 | 69.0 | 210 |
| 16D | 12H Penford Gum 280 | 12 pt 6 pt | 1,900 | 67.6 | 355 |
| 16E | 12H Penford Gum 280 | 9 pt 9 pt | 2,450 | 67.6 | 255 |
| 16F | Grafted Enzyme Thinned Starch | 16 pt | 650 | 72.7 | 130 |
| 16G | Grafted Enzyme Thinned Starch | 18 pt | 2,880 | 69.7 | 50 |
| 16H | Grafted Enzyme | 12 pt | 1,850 | 67.7 | — |

TABLE 16-continued

| Run No. | Binder Composition | | Viscosity of the Coating Colors (cps) | Gloss (%) | IGT* (ft/min) |
|---|---|---|---|---|---|
| | Thinned Starch Penford Gum 280 | 6 pt | | | |
| 16I | Latex | 18 pt | 1,500 | 75.5 | 610 |
| | CMC | 0.5 pt | | | |
| 16J | Latex | 12 pt | 1,800 | 74.3 | 550 |
| | Penford Gum 280 | 6 pt | | | |
| 16K | Latex | 9 pt | 2,200 | 73.0 | 380 |
| | Penford Gum 280 | 9 pt | | | |

*IGT measured with no. 3 tack ink. 53 pound base stock per 3,300 square feet.

Example 17

This example describes the evaluation of paper stock treated on a pilot scale coating machine with coating formulations comprising the binder material of the invention. This example demonstrates how the aqueous dispersion of the invention improves the properties of coated paper to which it is applied in comparison to the addition of ungrafted starch. Two formulations were tested, the first being a lightweight coating formulation and the second being a high gloss enamel formulation.

The lightweight coating control formulation (F-1) comprised 70.0 parts of a high brightness delaminated clay, 20.0 parts No. 2 grade clay, 10.0 parts lightly oxidized hydroxyethyl starch (Pencote ®), 0.20 part of a polyacrylate dispersant, 1.0 part calcium stearate lubricant and 0.60 part Sunrez 700C. About 45 preparations of grafted starch according to Example 12H were made and mixed together to make about 13 gallons of material. The test formulation (F-2) had grafted starch material substituted for the 10.0 parts of ungrafted Pencote ® starch.

The second control formulation (F-3) was a high gloss formula comprising starch, latex and polyvinyl acetate binders in addition to clay. Specifically, the formulation comprised 73.0 parts delaminated No. 2 clay, 1.0 part calcined clay, 3.0 parts titanium dioxide, 6.0 parts ungrafted Pencote ® starch, 8.0 parts styrene/1,3-butadiene latex, 2.0 parts polyvinyl acetate, 0.20 part of polyacrylate, 1.0 part of calcium stearate and 0.60 part of Sunrez 700C. The high gloss test formulation (F-4) comprised the same materials but with the grafted starch material mentioned above substituted for the 6.0 parts of ungrafted Pencote ®.

Printing paper base stock having a weight of 53 pounds per 3,300 square feet was coated on the pilot coating device with a blade angle of 45°, blade thickness of 0.015 inch and coater speed of 2000 feet per minute. Blade loading was adjusted to give the desired coat weight. Samples were then supercalendered at 80° C. and were subjected to a variety of tests including brightness, gloss, opacity, high pressure porosity, smoothness, ink receptivity, IGT pick, contact angle, and coat weight. The results are presented in Tables 17A for uncalendered coated paper and Table 17B for calendered coated paper.

Analysis of the results as presented in Tables 17A and B demonstrate that porosity and ink receptivity are improved without sacrificing gloss or smoothness properties for those papers coated with the coating compositions including the binder of the invention. While paper coated with the control compositions showed decreasing porosity as coat weight increased, the high porosity remained relatively constant with increasing coat weight of the composition of the invention up to nine pounds per side per 3300 square foot ream. Gloss was enhanced in both the lightweight and the high gloss enamel formulations.

With respect to pick resistance, the coating comprising the binder of the invention showed an advantage over the low weight composition comprising the starch alone. The coating compositions comprising the material of the invention also improved ink receptivity while at the same time improved water repellency.

TABLE 17A

| | | | | | | | | | | |
|---|---|---|---|---|---|---|---|---|---|---|
| | | | | | UNCALENDERED COATED PAPER | | | | | |
| | Run No. | Target Coating Wt (lbs) | H.P. Gurley Porosity (sec.) | Gloss (%) | Parker Print Surf. 10 KGF | Parker Print Surf. 20 KGF | IGT Pick CMS | Croda % Bright Drop | K & N % Bright Drop | Contact Angle* (°) |
| F-1 | 17A | 11 | 61.3 | 31.7 | 4.41 | 3.45 | 30 | 23.2 | 0.07 | 25.5 |
| | 17B | 12 | 54.7 | 26.3 | 4.63 | 3.65 | 31 | 21.4 | 14.4 | 23.5 |
| | 17C (1) | 13 | 34.8 | 22.5 | 5.04 | 4.08 | 33 | 27.3 | 24.3 | 23.8 |
| | 17C (2) | 13 | 54.0 | 24.5 | 4.77 | 3.84 | 31 | 22.5 | 21.5 | 25.0 |
| | 17D | 14 | 37.2 | 21.7 | 5.37 | 4.05 | 34 | 24.1 | 22.2 | 28.0 |
| | 17E | 15 | 33.9 | 19.5 | 5.93 | 4.46 | 32 | 31.1 | 24.8 | 27.0 |
| F-2 | 17F | 11 | 40.2 | 29.4 | 4.22 | 3.27 | 31 | 28.7 | 23.1 | 28.3 |
| | 17G | 12 | 33.6 | 26.0 | 4.80 | 3.43 | 33 | 31.5 | 27.6 | 28.0 |
| | 17H | 13 | 24.4 | 23.6 | 5.00 | 3.94 | 33 | 33.8 | 28.7 | 22.3 |
| | 17I | 14 | 22.9 | 21.6 | 5.63 | 4.12 | 34 | 33.7 | 26.9 | 30.0 |
| | 17K | 15 | 22.3 | 20.1 | 6.23 | 4.56 | 38 | 36.6 | 25.3 | 28.3 |
| F-3 | 17L | 11 | 63.8 | 37.8 | 4.21 | 3.51 | 34 | 26.2 | 16.7 | 34.3 |
| | 17M | 12 | 47.6 | 34.7 | 4.65 | 3.67 | 36 | 28.9 | 21.5 | 31.5 |
| | 17N | 13 | 33.0 | 32.4 | 4.88 | 3.90 | 37 | 36.8 | 21.7 | 36.0 |
| | 17O | 14 | 13.8 | 30.5 | 5.36 | 4.28 | 38 | 37.9 | 19.8 | 36.8 |
| | 17P | 15 | 11.0 | 28.3 | 5.65 | 4.63 | 40 | 38.9 | 20.8 | 33.5 |
| F-4 | 17Q | 9 | 92.5 | 47.6 | 3.92 | 2.91 | 38 | 27.9 | 25.9 | 31.0 |
| | 17R | 10 | 54.2 | 41.7 | 4.16 | 3.16 | 36 | 38.2 | 25.7 | 39.3 |
| | 17S | 11 | 62.5 | 42.2 | 4.22 | 3.29 | 36 | 23.5 | 23.0 | 40.8 |
| | 17T | 12 | 26.9 | 38.7 | 4.52 | 3.60 | 42 | 37.1 | 27.5 | 39.5 |
| | 17U | 13 | 19.8 | 36.2 | 4.74 | 3.78 | 43 | 36.1 | 24.6 | 37.0 |
| | 17V | 14 | 14.1 | 32.6 | 5.12 | 3.97 | 53 | 39.6 | 23.6 | 39.0 |
| | 17W | 15 | 8.6 | 33.7 | 5.35 | 4.05 | 68 | 42.0 | 25.1 | 39.5 |

*Angle did not change after standing for a period of 60 seconds.

TABLE 17B

CALENDERED COATED PAPER

| Run No. | Target Coating Wt (lbs) | H.P. Gurley Porosity (sec.) | Gloss (%) | Parker Print Surf. 10 KGF | Parker Print Surf. 20 KGF | IGT Pick CMS | Croda % Bright Drop | K & N % Bright Drop | Contact Angle* (°) |
|---|---|---|---|---|---|---|---|---|---|
| F-1 17C (2) | 13 | 102.9 | 60.6 | 1.91 | 1.38 | 16 | 24.9 | 15.9 | 32.3 |
| 17D | 14 | 74.8 | 59.1 | 1.87 | 1.40 | 17 | 28.2 | 19.0 | 31.5 |
| 17E | 15 | 64.6 | 59.5 | 1.94 | 1.42 | 16 | 32.5 | 19.7 | 30.8 |
| F-2 17G | 12 | 61.4 | 66.0 | 1.75 | 1.29 | 34 | 30.2 | 22.6 | 36.8 |
| 17H | 13 | 59.5 | 63.4 | 1.83 | 1.35 | 33 | 35.0 | 21.9 | 39.5 |
| 17I | 14 | 56.2 | 63.7 | 1.81 | 1.37 | 34 | 44.2 | 20.9 | 37.5 |
| F-3 17L | 11 | 121.4 | 65.9 | 2.01 | 1.49 | 39 | 31.8 | 16.0 | 35.5 |
| 17M | 12 | 95.3 | 64.5 | 2.05 | 1.52 | 44 | 33.1 | 18.8 | 35.8 |
| 17N | 13 | 59.2 | 63.2 | 2.14 | 1.53 | 60 | 37.9 | 18.0 | 35.8 |
| 17O | 14 | 31.1 | 61.3 | 2.17 | 1.62 | 65 | 39.3 | 18.5 | 40.8 |
| F-4 17S | 11 | 103.0 | 73.3 | 1.85 | 1.25 | 58 | 34.9 | 23.3 | 34.0 |
| 17U | 13 | 31.6 | 69.0 | 1.85 | 1.50 | 63 | 43.9 | 22.5 | 33.8 |
| 17V | 14 | 25.9 | 68.7 | 1.92 | 1.47 | 68 | 46.2 | 21.5 | 32.5 |
| 17W | 15 | 18.4 | 66.8 | 1.98 | 1.51 | 62 | 48.0 | 19.6 | 33.5 |

*Angle did not change after standing for a period of 60 seconds.

Example 18

This example illustrates preparation of large quantities of material in a pilot plant. Typically, a thin, lightly oxidized hydroxyethyl starch (Pencote ®) was slurried in tap water at a solids concentration of 3.12 lbs/gal. The starch was cooked through a jet cooker into a 300 gallon stainless steel jacketed, agitated pressure reactor. Cooking temperature was 210°-220° F. A total of 164 gallons of 29.7% solids starch paste was cooled to 87° F.

Monomers added to the starch were styrene and 1,3-butadiene in a 70/30 ratio with a total monomer to starch ratio of 60/100, based on dry starch. The surfactant, sodium dodecylbenzene sulfonate, 5% on the total monomer level, was dissolved in tap water at 13.8% solids and pumped into the cooled paste. This was followed by the addition of potassium persulfate, 4% based on total monomer, in a 5% solution. The DBSA and potassium persulfate and starch paste were allowed to mix for 10 minutes.

The agitator was turned off and 194 pounds of styrene were pumped into the reactor. The reactor was evacuated to approximately 22" Hg and then 83 pounds of butadiene were added to the reactor. Reactor pressure was 27 psig.

The reactor agitator was turned on and the steam applied to the jacket to heat the mixture. The reaction mass was heated to 173° F., at which time the steam was turned off. The temperature continued to increase. Cooling water was turned on at 198° F. and the temperature peaked at 211° F. Cooling water was turned off when the reactor cooled to 192° F. The pressure reached 63 psig during the reaction and then started down prior to reaching the peak temperature. The temperature was allowed to drop to 172° F. at which time another 1% potassium persulfate (based on total monomer) was added to the reaction. Final solids were 34.7%. Total reaction time was 5.7 hours. The pH was adjusted to 5.1 with ammonium hydroxide. The resulting dispersion was evaluated with respect to final solids content, grafting efficiency and ratio of extractable monomers and polymers to unextractable solids. The grafted starch product was also used as a binder in a paper coating composition and the properties of paper coated therewith were evaluated according to the methods of Example 11.

In runs 18B and C, differing peak temperatures were obtained while in run 18D, a higher amount of initiator was introduced.

In run 18E, lower initial solids were used giving a lower final solids content of 31.0%. Also, a second addition of 1% potassium persulfate was made at 1.7 hours. In run 18F, the initial potassium persulfate level was lowered to 3%. Also a second addition of 1% was made at 6.1 hours.

In Table 18, the reaction time is measured from the start of heating. Grafting efficiency and ratio of ungrafted polymers to grafted product were measured as given in Example 7. The coatings were prepared as given in Example 15, using 18 parts binder to 100 parts clay. However, in run 18E, the clay slip was prepared by slurrying the clay in a mixture of grafted starch and water.

Results indicate good coated paper gloss and IGT (No. 3 ink) values over a range of conditions and grafting efficiencies.

TABLE 18

Pilot Reactions

| Run | Initial Potassium Persulfate (%) | Time of Additional 1% Potassium Persulfate (hrs) | Peak Temp. (°F.) | Peak Pressure (psig) | Total Reaction Time (hrs) | Final Solids (%) | Grafting Efficiency (%) | Extract/ Unextract Ratio | Coating Visc. (cps) | IGT (fpm) | Gloss (%) |
|---|---|---|---|---|---|---|---|---|---|---|---|
| 18A | 4 | 5.7 | 211 | 63 | 9.0 | 34.7 | 8.4 | 0.495 | 550 | 175 | 70.4 |
| 18B | 4 | 7.5 | 181.5 | 48 | 11.0 | 33.8 | 57.1 | 0.183 | 2300 | 215 | 66.9 |
| 18C | 4 | 8.9 | 197 | 60 | 10.7 | 34.8 | 32.9 | 0.320 | 1000 | 195 | 68.9 |
| 18D | 4 | 9.0 | 183 | 59 | 10.5 | 33.8 | 10.8 | 0.473 | 1000 | 260 | 69.4 |
| 18E | 5 | 9.1, 11.7* | 183 | 51 | 12.5 | 31.0 | 40.4 | 0.275 | 1650 | 230 | 70.1 |
| 18F | 3 | 4.7, | 192 | 52 | 7.3 | 33.7 | 58.9 | 0.174 | — | — | — |

TABLE 18-continued

| | | | | Pilot Reactions | | | | | | |
|---|---|---|---|---|---|---|---|---|---|---|
| Run | Initial Potassium Persulfate (%) | Time of Additional 1% Potassium Persulfate (hrs) | Peak Temp. (°F.) | Peak Pressure (psig) | Total Reaction Time (hrs) | Final Solids (%) | Grafting Efficiency (%) | Extract/ Unextract Ratio | Coating Visc. (cps) | IGT (fpm) | Gloss (%) |
| | | 6.1* | | | | | | | | | |

*An additional 1% Potassium Persulfate was added twice in these runs.

Example 19

An enzyme thinned, lightly oxidized hydroxyethyl starch (Pencote ®) was reacted with styrene and butadiene monomers in the presence of a potassium persulfate catalyst to produce a stable aqueous high solids polymeric dispersion. Pencote ® starch was cooked at 35% solids in a laboratory cooker at approximately 98° C. for 1 hour. During this time, enough water was allowed to evaporate to raise the solids to 37.3%. The material was cooled to 88° C. and 0.016% (on the dry basis starch) alpha-amylase (Canalpha, Biocon [U.S.] Inc., Lexington, KY) was added. The temperature was maintained at 88° C. for 90 min. To this material 0.32% (on the dry basis starch) hypochlorite (16% available chlorine) was added to deactivate the enzyme. According to this procedure, 1475 g of the cooled, cooked material were added to a 2 liter pressure reactor (Parr instrument) followed by 16.5 g of potassium persulfate, 90 g of water, 231 g of styrene monomer and 99 g of butadiene monomer. The mixture was stirred and heated to 70° C. where it was held for 7 hours. The resulting dispersion was allowed to cool to room temperature and was then adjusted to a pH of 4 with 25 wt. % NaOH and then to a pH of 7.9 with solid $Na_2CLO_3$ The grafted product was used in a 60-62% solids coating composition at 18 parts binder (dry substance basis) to 100 parts No. 1 clay and applied to 53 pound and 29 pound unfinished base stock at about 6 pounds per side per 3300 square feet. Coating results are shown in Table 19 (see after Example 22).

Example 20

An enzyme thinned, lightly oxidized hydroxyethyl starch (Pencote ®) was reacted with styrene, butadiene and acrylic acid in the presence of a free radical catalyst to produce a stable aqueous high solids dispersion. Pencote ® starch was cooked and thinned according to the procedure in Example 19. Into a 2 liter pressure reactor (Parr instrument) 1475 g of the cooked and cooled, thinned Pencote ® at 37.3% solids (dry basis) were added, followed by 16.5 g potassium persulfate, 90 g water, 3.3 g acrylic acid monomer, 231 g styrene monomer and 99 g butadiene monomer. The mixture was stirred and heated to 70° C. where it was held for 7 hours. The dispersion was allowed to cool to room temperature. It was then adjusted to a pH of 4 with 25 wt. % NaOH and then to a pH of 7.9 with solid $Na_2CO_3$.

The product was then incorporated into a coating composition and used to coat paper according to the method of Example 19. Coating results are shown in Table 19.

Example 21

In this example, a large pilot quantity of material was produced using an enzyme thinned, lightly oxidized, hydroxyethyl corn starch (Pencote ®). The starch was slurried in tap water at a solids concentration of 21.5° Be' at 27° C. The starch was cooked through a jet cooker at 100°-105° C. into a 300 gallon stainless steel jacketed, agitated pressure reactor. A total of 158 gallons of cooked Pencote ® at 35.8% solids were cooled to 90° C. and 35 ml of alpha-amylase (Canalpha, Biocon [U.S.] Lexington, KY) were added. After 110 min. of thinning, 880 ml $H_2O_2$ (50% solution) were added to deactivate the enzyme. The material was then cooled to 40° C.

To the thinned Pencote ® 16.5 lbs. dry potassium persulfate, 232 lbs. styrene monomer and 99 lbs. butadiene monomer were added. The mixture was heated, under agitation, up to 76° C. in four hours and then brought down and held at 71° C. for seven additional hours. The maximum pressure was 59 psig. The dispersion was cooled to 55° C. and the pH was adjusted to 4.7 with 9800 ml of 1:2 aqueous $NH_4OH$. To the dispersion, 620 g of benzoyl peroxide were added and the mixture was held at 50°-55° C. for approximately 12 hours. The dispersion was degassed and placed in 55 gal. drums The product was then incorporated into a coating composition and used to coat paper according to the method of Example 19. Coating results are shown in Table 19.

Example 22

According to this example, a large pilot plant quantity of material was prepared using enzyme thinned Pencote ® starch as the starting material. The Pencote ® starch was slurried to 22.8° Be' at 32.5° C. in tap water. The starch was cooked through a jet cooker into a 300 gal. stainless steel jacketed, agitated pressure reactor. Cooking temperature was 99°-105° C. A total of 156 gal. of paste at 40.7% solids was cooled to 90° C. and 60 ml of alpha-amylase (Canalpha, Biocon [U.S.] Lexington, KY) were added. The enzyme was deactivated after 115 min. with 1000 ml of hypochlorite (16% available chlorine). The material was then diluted to a 25 solids at 39.4% and cooled to 50° C.

To the thinned Pencote ® 11.2 lbs. dry potassium persulfate, 264 lbs. styrene monomer and 113 lbs. butadiene monomer were added. The mixture was heated under agitation to 70° C. and was held at this temperature for 4.75 hours. The maximum pressure was 55 psig. At this time, the reactor was opened and 7.7 lbs. of potassium persulfate were added. The reaction was continued at 70° C. for an additional 4.5 hours. The dispersion pH was adjusted to 4.1 with 4.25 gal. of 12 wt. % NaOH. Then 0.5 gallon of saturated $Na_2CO_3$ was added to bring the pH to 6.1.

The product was then incorporated into a coating composition and used to coat paper according to the method of Example 19. Coating results are shown in Table 19.

TABLE 19

| Run No. | Binder Composition | Viscosity After Grafting | Viscosity of the Coating Colors (cps)[2] | Gloss* % | IGT** cm/sec |
|---|---|---|---|---|---|
| 19A | 19 | 530[2] | 1550 | 71.0 | 140 |
| 19B | 20 | 880[2] | 1610 | 70.7 | 146 |
| 19C | 21 | 330[1] | 2000 | 72.7 | 139 |
| 19D | 22 | 1050[1] | 500 | 74.0 | 144 |

[1]Viscosity measured with Brookfield spindle #3 at 20 rpm.
[2]Viscosity measured with Brookfield spindle #4 at 20 rpm.
*53 lb. base stock per 3300 square feet.
**IGT measured with low viscosity pick test oil. Spring Set A, 35 Kg pressure. 29 lb. base stock per 3300 square feet.

Example 23

In this example, 1,3-butadiene alone is grafted to enzyme thinned hydroxyethylated starch (Pencote®) with different levels of potassium persulfate and reaction times.

Grafting Procedure:

Amount of 1250 g d.s. of Pencote® was slurried in water at 30% solids and cooked in a laboratory steam cooker at 97°-98° C. for 20 minutes. The cooked Pencote® paste was cooled to 88° C. and 320 microliters of alpha-amylase were added. The Pencote® and alpha-amylase mixture was maintained at 88° C. for one hour and 30 minutes with agitation. During the cooking and enzyme thinning stages, enough water was allowed to evaporate to raise the solids to about 44%. Enzyme was then deactivated by the addition of a small amount of hypochlorite. The enzyme thinned Pencote® paste was cooled to room temperature and was then used in the grafting reactions.

Several grafting reactions were carried out with different amounts of potassium persulfate and reaction times. The reaction parameters are listed in Table 20. According to this procedure, a desired amount of enzyme thinned Pencote® paste was added to a two-liter pressure reactor (Parr Instrument) followed by potassium persulfate, additional water to obtain a final solids of 47%, and butadiene monomer. The reactor was stirred and heated to 70° C. where it was held for the desired amount of time. The resulting product was cooled to room temperature and grafting efficiency of the grafting reaction was determined

TABLE 20

Grafting Butadiene to Enzyme Thinned Pencote® Paste

| Reaction Parameters and Results | Run 23A | Run 23B | Run 23C |
|---|---|---|---|
| Enzyme thinned Pencote® paste at 44% solids, g | 1704.55 | 1704.55 | 1704.55 |
| Potassium persulfate powder, g | 6.75 | 13.50 | 13.50 |
| Dilution water, g | 51.04 | 72.18 | 58.65 |
| Butadiene, g | 135.00 | 147.00 | 138.00 |
| Reaction temperature, °C. | 70 | 70 | 70 |
| Reaction time, hours | 10 | 10 | 20 |
| Calculated final solids, % | 47.0 | 47.0 | 47.0 |
| Grafting Efficiency (%) | 86.3 | 76.9 | 71.4 |
| Ratio of Extractable Monomers and Polymers/Unextractable Solids | 0.012 | 0.039 | 0.045 |

Grafting Efficiency Determination:

An alternative procedure from that described in Example 7 is set out herein for determining the efficiency of grafting and the ratio of extractable monomers and polymers to unextractable solids comprising grafted starch. According to the procedure of Example 7, isopropanol is added to the dispersion of grafted starch causing the grafted starch to precipitate out. The contents are then filtered and the filter cake dried and weighed. This procedure is useful for relatively high molecular weight starch such as that of Example 7 but is less useful with lower molecular weight starches such as those of this example which utilize enzyme thinned Pencote® because the lower molecular weight grafted starch products tend to gel and resist filtration.

According to an alternative procedure, ten grams dry weight of the grafted product dispersion were diluted to 30% solids with water. This diluted dispersion was then slowly pipetted into 300 ml of cooled isopropanol (isopropanol was cooled to 5° C. in an ice water bath) while it was stirring. The grafted product was precipitated as small solid particles. After the addition of the product dispersion to isopropanol was completed, the product and isopropanol mixture was stirred at 5° C. for at least one hour. The mixture was then vacuum filtered through Whatman filter paper No. 1, and transferred to a drying dish and dried overnight in a ventilated hood. The product was then extracted with tetrahydrofuran (THF) in a Soxhlet extractor to remove the monomer and ungrafted polymer. The extraction was extended until the weight of extracted product remained unchanged (normally it took two to three days to complete the extraction). The extracted product was air dried and then oven dried at 115° C. for one day, and its weight was obtained. The oven dried weight of the product after extraction was used in the calculation of grafting efficiency and the ratio of extractable vinyl grafting monomers and polymers thereof/unextractable solids which are defined as follows:

T = dry weight of the grafted product before extraction.
GS = dry weight of the unextractable solids.
OS = dry weight of the starch before grafting.
M = weight of monomer(s) used.
Ad = dry weight of the additives used in the grafting reaction, i.e., initiator, surfactant, etc.

From these values, one can calculate:

Amount of extractable vinyl grafting monomer(s) and polymers thereof, UP: UP = T − GS.

Amount of grafted polymer and unextractable cross-linked polymer, GP: GP = GS − (OS + Ad).

Grafting efficiency (GE) in percent: GE = (GP/M) × 100.

And ratio of extractable vinyl grafting monomer(s) and polymers thereof/unextractable solids = UP/GS.

The results of grafting of butadiene to enzyme thinned Pencote® paste with various levels of potassium persulfate and reaction time are shown in Table 20. Those of skill in the art will appreciate that other precipitating agents and solvents may be used for determining the extractable/unextractable ratio where grafting monomers other than or in addition to styrene are used in combination with 1,3-butadiene or where it is otherwise appropriate.

Example 4

According to this example, a paper coating comparison was made between the 1,3-butadiene containing aqueous dispersion of the present invention and an ethyl acrylate containing dispersion similar to that of Example II of Kightlinger, et al., U.S. Pat. No. 4,301,017 Specifically, ethyl acrylate/acrylonitrile were grafted to a thin, lightly oxidized hydroxyethyl starch (Pencote®) in a ceric ammonium nitrate initiated grafting reaction. Two products with different solids concentrations, one with 35% solids and another with 45% solids, were made and compared with a styrene/1,3-butadiene product of the invention when the dispersions were used as binders in coating color compositions for paper coating.

Coating colors containing 16 parts dispersion as binder and 100 parts No 1 delaminated clay (Nuclay) were prepared with each of the three dispersions according to the method of Example 2. The coating colors were then applied to 53 pound Mead base stock at a coating weight of 6 pounds per 3300 square feet per side. Gloss and IGT of the coated papers were then determined according to the method of Example 16 with the results shown in Table 21 below. Despite the fact that the styrene/1,3-butadiene containing dispersion of the invention had a lower monomer to starch ratio than the ethyl acrylate dispersions, the paper coated with the material had equal, if not superior, gloss to those coated with the ethyl acrylate materials. This is surprising in light of the fact that acrylates are known in the art for providing high levels of gloss. The dispersion of the invention provided clearly superior IGT pick performance with No. 3 ink exhibiting no pick at an IGT speed of up to 500 feet per minute.

TABLE 21

| Run | 24A | 24B | 24C |
|---|---|---|---|
| Monomer(s) | EA | EA | S & B |
| Initiator | CAN | CAN | KP |
| Starch Type | Y | Y | Y |
| Monomers/starch ratio | 81/100 | 81/100 | 60/100 |
| Solids, % d.s. | 35.6 | 43.7 | 34.6 |
| Viscosity, cps | 790 | 4,650 | 2,440 |
| Residual monomer | Very high | Very high | Very low |
| Grafted Paper Properties | | | |
| Gloss (%) | 71.7 | 70.2 | 72.2 |
| IGT (ft/min) | 420 | 380 | no pick at 500 |
| Coating color viscosity cps | 1,700 | 1,900 | 1,000 |

EA = Ethyl Acrylate/Acrylonitrile;
S & B = Styrene and 1,3-Butadiene in a 70/30 weight ratio mixture;
CAN = Cerium Ammonium Nitrate;
KP = Potassium Persulfate;
Y = Lightly Oxidized Hydroxyethyl Starch (Pencote ®).

Example 25

This example illustrates the preparation of 1,3-butadiene containing starch graft copolymers according to the method disclosed in Example II of Kightlinger, U.S. Patent No. 4,301,017. Experimental runs according to the teachings of Example II of the Kightlinger patent were conducted for 1,3-butadiene alone and for mixtures of styrene and 1,3-butadiene at 70/30 weight ratios for both ceric ion and persulfate initiators. The teachings of Example II of Kightlinger were generally followed with the major exception that 1,3-butadiene alone or a 70:30 weight ratio mixture of styrene and 1,3-butadiene were used as grafting monomers in place of ethyl acrylate and acrylonitrile. In addition, the post-polymerization reaction of Example II utilizing ammonium persulfate and sodium metabisulfite to reduce unreacted monomers was not carried out and the surfactant and diluent water present in the reaction varied slightly in runs 25A through 25D only.

Some experimental runs were conducted with enzyme thinned cyanoethyl starch prepared according to the method described in Example II of the Kightlinger patent. The starch was reacted to yield a final product having a solids content of 45% as specified by that example. Other experiments were run with the enzyme thinned cyanoethyl starch to yield a final product having a solids content of 35%. Still other experiments were run with a lightly enzyme thinned hydroxyethylated starch (Pencote ®, Penford Products, Inc.) to yield a final product having a solids content of 45%. Each experiment was run utilizing either a ceric ammonium nitrate (CAN) initiator as taught by Kightlinger or a potassium persulfate (KP) initiator according to the method of the invention.

In experimental runs 25A through 25D, grafting was to a lightly enzyme thinned hydroxyethylated starch (Pencote ®, Penford Products Co. ) This starch was characterized by a degree of substitution of 0.07; a Brookfield viscosity at 53° C. of 445 cps; and an intrinsic viscosity of 0.206 dl/g at 25° C. A 900 gram dry solids starch slurry at 32% solids was cooked and then thinned with alpha-amylase (600,600 BU/ml) to the given intrinsic viscosity. The enzyme was deactivated with 2.7 ml of hypochlorite (16% available chlorine) solution. The paste was coated to 25°-30° C. and 1,247 grams were placed in a pressure vessel to which 21.6 grams of dilution water were added followed by 9.3 grams of Triton X-200 surfactant (28% solids) and 37.5 grams of initiator solution (28% solids). These components were then thoroughly mixed before 327.0 grams of monomer(s) were added. When 1,3-butadiene alone was used as a grafting monomer, the reactor vessel was sealed and 1,3-butadiene was introduced to the vessel. When a mixture of styrene and 1,3-butadiene was used, styrene was added to the mixture and the reactor vessel was then sealed to introduce the 1,3-butadiene gas. The mixer was then turned on and the reactor heated to a temperature of 75° C. and maintained there for six hours. Experimental runs were conducted for grafting of 1,3-butadiene alone and of mixtures of styrene and 1,3-butadiene at 70/30 weight ratios with both ceric ammonium nitrate and potassium persulfate initiators.

The remaining experimental runs 25E through 25M were conducted by grafting 1,3-butadiene alone and styrene/1,3-butadiene mixtures to an enzyme thinned cyanoethyl starch such as used in Example II of Kightlinger using either ceric ammonium nitrate or potassium persulfate initiators. The cyanoethyl starch was prepared as Kightlinger described. This starch was cooked and enzyme thinned as described above. The enzyme thinned cyanoethyl starch was characterized by a degree of substitution of 0.14 and an intrinsic viscosity of about 0.16 dl/g at 25° C. The thinned paste was cooled to 25°-30° C. and 1,247 grams of the paste at 32% solids were placed in a pressure vessel with 12.7 grams of dilution water, 32.9 grams of Triton X-200 surfactant (28% solids), 37.5 grams of initiator solution (28% solids) and 327.0 grams of monomer(s). The mixture was then reacted at a temperature of 75° C. for 6 hours as above.

The results of the comparative experimental runs are presented in Table 22 and demonstrate that the use of the potassium persulfate initiator provides unexpected and dramatic improvements in grafting of 1,3-butadiene monomer along and 1,3-butadiene containing monomer mixtures to starch. Moreover, the grafted product resulting from the highly efficient grafting reaction is characterized by unexpected superior properties including improved stability, low levels of residual monomers and reduced levels or the substantial absence of coagulum. The final dispersions of the persulfate initiated grafting reactions were very homogeneous although they exhibited a high viscosity, gel-like characteristic when fresh as well as after several days of storage. The stability of the dispersion and the low levels of residual monomer are believed to result from the highly efficient nature of the grafting reaction. The substantial absence of coagulum is believed to result from the specificity of the grafting reaction and the reduction of ungrafted polymers.

Experimental runs comparing grafting of 1,3-butadiene along to starch demonstrate dramatic improvements in final solids level, grafting efficiency and in the ratio of extractable polymers to unextractable solids resulting from the use of a potassium persulfate initiator instead of ceric ion as taught by Kightlinger. Moreover, the failure of significant amounts of 1,3-butadiene to react in ceric ion initiated grafting reactions is confirmed by the low level of actual solids of the grafted product in comparison with the calculated solids based on the quantity of monomer introduced into the reaction mixture. In those experimental runs in which ceric ammonium nitrate was used to graft 1,3-butadiene alone, high amounts of unreacted gaseous butadiene were released from the reaction vessel at the conclusion of the grafting reaction. The release of this butadiene was not effectively accounted for in the calculation of grafting efficiency with the result that the calculated grafting efficiencies in the runs for 1,3-butadiene alone reacted with ceric ammonium nitrate are unusually high and the calculated ratios of extractable monomers and polymers to unextractable solids are unrealistically low for the poorly grafted reaction products.

Not only did the use of the persulfate initiator result in unexpected improvements in the efficiency of grafting of 1,3-butadiene alone and styrene/1,3-butadiene mixtures to starch over the method taught by Kightlinger, but the grafted products of the persulfate initiated reactions exhibited unexpected superior properties. Specifically, the reaction products of ceric ion initiated grafting of 1,3-butadiene alone and styrene/1,3-butadiene monomer mixtures according to the method of Example II of Kightlinger were characterized by low solids levels and by a relatively lower viscosity than the persulfate initiated products but were very unstable with phase separation or formation of a multiphase solid "gel" being observable after a few days of storage. Those products were characterized by high levels of unreacted monomer, and substantial levels of coagulum (grit) that in some applications may render the material unsuitable In contrast, the products of the persulfate initiated grafting of 1,3-butadiene and styrene/1,3-butadiene monomer mixtures were characterized by small amounts of unreacted monomer and were substantially coagulum free such that they were suitable for applications demanding a high level of homogeneity and purity such as paper coating.

The amount of ceric ion initiator used was doubled in experimental run 25I to confirm that the relatively poor grafting results with the use of the ceric ammonium nitrate initiator were not a consequence of an insufficient concentration of the initiator. The grafting results of the run were essentially identical to those of run 25G which used the lower amount of ceric ion initiator taught by Example II of Kightlinger.

Experimental runs were also conducted with lower solids levels of the thinned cyanoethyl starch. While Example II of the Kightlinger patent disclosed a final product having a solids content of 45% and sufficient starch was supplied to earlier experimental runs so as to produce product having this solids level, experimental runs 25J and 25K were run according to the method described generally for runs 25E through 25M except that sufficient additional dilution water was added to the reactor to produce a product having a solids content of 35%. Lowering the solids was found slightly reduced the amount of coagulum with the ceric ammonium nitrate but still had very clear phase separation. The comparable run with potassium persulfate was satisfactory.

TABLE 22

| Run | 25A | 25B | 25C | 25D | 25E | 25F |
|---|---|---|---|---|---|---|
| Monomer(s) | B | B | S & B | S & B | B | B |
| Initiator | CAN | KP | CAN | KP | CAN | KP |
| Starch | Y | Y | Y | Y | Z | Z |
| Calculated Solids (%) | 45 | 45 | 45 | 45 | 45 | 45 |
| Actual Solids of Grafted Product (%) | 33.8 | 43.0 | 35.2 | 45.9 | 33.8 | 45.6 |
| Grafting Efficiency (%) | 40.9 | 70.7 | 16.1 | 79.3 | 49.1 | 70.2 |
| Extractable/Unextractable Ratio Character of Grafted Product | 0.351 | 0.148 | 0.585 | 0.100 | 0.294 | 0.153 |
| Residual Monomer: | Very High | Low | High | Almost None | Very High | Low |
| Coagulum: | High | Low | High | None | Very High | Low |
| Appearance: | Soft Foamy | Rubbery Gel Chunks | Liquid Unstable | Firm Gel Stable | Liquid Unstable Separate | Rubbery Gel |

| Run | 25G | 25H* | 25I | 25J | 25K | 25L | 25M |
|---|---|---|---|---|---|---|---|
| Monomer(s) | S & B | S & B | S & B | S & B | S & B | B | B |
| Initiator | CAN | KP | CAN (2x) | CAN | KP | CAN | KP |
| Starch | Z | Z | Z | Z | Z | Z | Z |
| Calculated Solids (%) | 45 | 45 | 45 | 35 | 35 | 35 | 35 |
| Actual Solids of Grafted Product (%) | 31.1 | 47.1 | 31.1 | 24.2 | 34.2 | — | — |
| Grafting Efficiency (%) | 10.1 | 76.4 | 2.1 | 0.5 | 62.6 | — | — |
| Extractable/Unextractable Ratio Character of Grafted Product | 0.645 | 0.115 | 0.727 | 0.767 | 0.195 | — | — |

TABLE 22-continued

| Residual Monomer: | High | Almost None | High | Very High | Almost None | Very High | Low |
|---|---|---|---|---|---|---|---|
| Coagulum: | High | None | High | Low | None | High | None |
| Stability: | Liquid Unstable Separated | Firm Gel Stable | Liquid Unstable Separated | Liquid Unstable Separated | Soft Gel Stable | Liquid Unstable Separated | Firm Gel Stable |

B = 1,3-Butadiene;
S & B = Styrene and 1,3-Butadiene in a 70/30 weight ratio mixture;
CAN = Cerium Ammonium Nitrate;
CAN (2x) = Double concentration of CAN;
KP = Potassium Persulfate;
Y = Lightly Enzyme Thinned Hydroxyethyl Starch (Pencote ®);
Z = Enzyme Thinned Cyanoethyl Starch.
*This experimental run was the second of two identical runs where the first run overheated as a consequence of a mixing failure.

Example 26

This example illustrates the use of oxygen as an initiator in the preparation of styrene/1,3-butadiene containing starch graft copolymers. Borunsky U.S. Pat. No. 3,138,564 discloses in Example IX a procedure in which styrene and 1,3-butadiene are said to be grafted onto oxidized granular starch at a high monomer to starch ratio (4:1 by weight) by initiation with ozone or oxygen.

Experimental runs were conducted in which granules of a thin, lightly oxidized hydroxyethyl starch (Pencote ®, Penford Products, Inc.) were reacted with a 70/30 weight ratio styrene/1,3-butadiene monomer mixture at both high and low monomer to starch ratios by bubbling oxygen through the reaction mixture in amounts similar to Borunsky. (Runs 26A and 268.) A highly enzyme thinned paste of the same starch was reacted using oxygen as an initiator with the same monomer. mixture at a high monomer to starch ratio (Run 26C) while a paste of a hydroxyethylated starch (Penford Gum 280) was reacted using oxygen as an initiator with the same monomer mixture at a moderate monomer.. to starch ratio (Run 26D). In addition, a thin, lightly oxidized hydroxyethyl starch (Pencote ®) paste was reacted with the same monomer mixture at a low monomer to starch ratio using potassium persulfate as an initiator.

The resulting products were tested to determine grafting efficiency and the ratio of ungrafted monomers and polymers to grafted product according to the method of Example 23 with the results presented in Table 23. It was determined that reaction under the high monomer to starch ratio conditions of run 26A resulted in a slurry of granular product having a grafting efficiency of 68.2% and an extractable monomer and polymer to unextractable solids ratio of 0 313. It is believed, however, that given the high ratio of monomer to starch, some cross-linking occurred resulting in inextractable polymers and apparently showing a higher grafting efficiency than had actually occurred. In contrast, no grafting was determined to take place during the reaction of run 26B having a much lower ratio of monomer to starch. That experimental run resulted in a granular product characterized by a grafting efficiency of 0% and an extractable monomer and polymer to unextractable solids ratio of 0.657.

Experimental runs in which oxygen was used to initiate grafting of 1,3-butadiene and styrene to a gelatinized starch paste provided only minor improvements in grafting efficiency. In run 26C, a paste comprising lightly oxidized hydroxyethyl starch (Pencote ®), which had been enzyme thinned according to the method of Example 19, was reacted as above with the monomer mixture comprising 70% styrene and 30% 1,3-butadiene by weight reacted at a high monomer to starch ratio of 75 parts monomer to 20 parts starch. The resulting product was characterized by a grafting efficiency of 79.1% and by an extractable monomer and polymer to unextractable solids ratio of 0.186.

In run 26D, an attempt was made to graft the styrene/1,3-butadiene monomer mixture by bubbling oxygen through a gelatinized hydroxyethylated starch (Penford Gum 280, Penford Products, Inc.). In this run the 70/30 styrene/1,3-butadiene mixture was grafted at a monomer to starch ratio of 48 parts monomer to 49 parts starch. The resulting product was tested and characterized by a graft efficiency of 14% and an extractable monomer and polymer to unextractable solids ratio of 0.704.

The product of runs 26A-26D was characterized by large amounts of coagulum on reactor surfaces The remaining dispersions were fairly stable but exhibited a low solids content.

Run 26E was conducted according to the method of the invention wherein the 70/30 styrene/1,3-butadiene monomer mixture was run at a monomer to starch ratio of 36 to 61 in the presence of a persulfate initiator In contrast to the results of runs 26A-D and despite the relatively low ratio of monomer to starch, the product of run 26E was a stable dispersion having low residual monomers and was characterized by being substantially free of coagulum and by having a grafting efficiency of 92.4% and an extractable monomer and polymer to unextractable solids ratio 0.028.

TABLE 23

| Run | 26A | 26B | 26C | 26D | 26E |
|---|---|---|---|---|---|
| Monomers | S & B | S & B | S & B | S & B | S & B |
| Initiator | Oxygen | Oxygen | Oxygen | Oxygen | KP |
| Starch Type | W | W | W' | X | W |
| Form | Granule | Granule | Paste | Paste | Paste |
| Starch d.s. (parts by weight) | 20 | 58 | 20 | 49 | 61 |
| Monomers (parts by weight) 70% Styrene/ 30% Butadiene | 75 | 35 | 75 | 48 | 36 |
| Additives (parts) | 5 | 7 | 5 | 3 | 3 |
| Calculated Solids (%) | 32.8 | 38.4 | 32.8 | 25.0 | 50.6 |
| Grafting Efficiency (%) | 68.2 | 0 | 79.1 | 14 | 92.4 |
| Extractable/ Unextractable | 0.313 | 0.657 | 0.186 | 0.704 | 0.028 |

TABLE 23-continued

| Run | 26A | 26B | 26C | 26D | 26E |
|---|---|---|---|---|---|
| Ratio | | | | | |

S & B = Styrene and 1,3-Butadiene in a 70/30 weight ratio mixture;
KP = Potassium Persulfate;
W = Lightly Oxidized Hydroxyethyl Starch (Pencote ®);
X = Hydroxyethyl Starch (Penford Gum 280 ®);
W' = Lightly Oxidized Hydroxyethyl Starch (Pencote ®) subjected to enzyme thinning according to Example 19.

What is claimed is:

1. A stable aqueous polymeric dispersion comprising at least 20% by weight of solids comprising a graft copolymer which is the reaction product of a thinned, gelatinized starch and one or more vinyl grafting monomers, said grafting monomer(s) comprising at least 10% diene by weight with a grafting monomer to starch ratio of between about 2:10 and about 23;10, the weight ratio of extractable grafting monomer(s) and polymers thereof to unextractable solids comprising grafted starch being 0.2 or less.

* * * * *